US012717161B2

(12) United States Patent
Noda et al.

(10) Patent No.: US 12,717,161 B2
(45) Date of Patent: Aug. 25, 2026

(54) AIR FLOATING VIDEO DISPLAY APPARATUS INCLUDING MULTI-LAYERED POLARIZATION SEPARATORS AND A CROSSTALK SHIELDING MEMBER

(71) Applicant: Maxell, Ltd., Kyoto (JP)

(72) Inventors: Masaki Noda, Kyoto (JP); Koji Fujita, Kyoto (JP)

(73) Assignee: MAXELL, LTD., Kyoto (JP)

( * ) Notice: Subject to any disclaimer, the term of this patent is extended or adjusted under 35 U.S.C. 154(b) by 304 days.

(21) Appl. No.: 18/533,231

(22) Filed: Dec. 8, 2023

(65) Prior Publication Data

US 2024/0192518 A1 Jun. 13, 2024

(30) Foreign Application Priority Data

Dec. 9, 2022 (JP) ................................ 2022-196888
Mar. 9, 2023 (JP) ................................ 2023-036798

(51) Int. Cl.
*G02B 30/56* (2020.01)
*G02B 5/30* (2006.01)
*G02B 27/28* (2006.01)

(52) U.S. Cl.
CPC ........... *G02B 30/56* (2020.01); *G02B 5/3083* (2013.01); *G02B 27/283* (2013.01)

(58) Field of Classification Search
CPC ..... G02B 30/56; G02B 27/283; G02B 5/3083
See application file for complete search history.

(56) References Cited

U.S. PATENT DOCUMENTS 5,583,695 A * 12/1996 Dobrusskin ............. H01J 29/89 359/633
5,621,572 A * 4/1997 Fergason ........... G02B 27/0172 359/633
5,782,547 A * 7/1998 Machtig ............... H04N 13/346 348/E7.083
5,861,993 A * 1/1999 Shanks .................. G02B 30/56 359/629
6,481,851 B1 * 11/2002 McNelley .............. G03B 15/10 359/488.01
10,810,915 B2 * 10/2020 Tokuchi ................. G09G 3/003
2002/0012105 A1 * 1/2002 Meyers .................. G03B 21/28 353/38
2006/0066811 A1 * 3/2006 Sato ..................... G02B 27/283 353/20
2008/0198459 A1 * 8/2008 Fergason ................ G02B 5/12 348/E5.09
2010/0110384 A1 * 5/2010 Maekawa ............. G03B 35/18 353/10

(Continued)

FOREIGN PATENT DOCUMENTS

JP 2019-128722 A 8/2019

*Primary Examiner* — Bao-Luan Q Le
(74) *Attorney, Agent, or Firm* — XSENSUS LLP

(57) ABSTRACT

An air floating video display apparatus includes a display panel that displays a video, a retroreflector that reflects the video light from the display panel and forms an air floating video in air by the reflected light, and a polarization separator arranged between the display panel and the retroreflector at a predetermined angle with respect to the display panel, and the retroreflector is arranged to face the display panel obliquely at a predetermined angle.

20 Claims, 26 Drawing Sheets

(56) References Cited

U.S. PATENT DOCUMENTS

2012/0268640 A1* 10/2012 Shimatani ......... G02F 1/133524 348/333.1
2012/0313839 A1* 12/2012 Smithwick ............. G02B 30/30 345/6
2015/0301347 A1* 10/2015 Juni ..................... H04N 13/365 353/10
2016/0156887 A1* 6/2016 Liu ...................... G03B 21/145 348/744
2016/0261301 A1* 9/2016 Juni ........................ H04M 1/04
2017/0031157 A1* 2/2017 Koito ..................... G02B 5/124
2017/0242173 A1* 8/2017 Numata ................... G02B 5/08
2017/0261759 A1* 9/2017 Yamamoto ........... G02B 5/3083
2017/0285359 A1* 10/2017 Numata ............... G02B 5/3058
2017/0285402 A1* 10/2017 Koito ..................... G02B 30/56
2018/0024373 A1* 1/2018 Joseph .................. G02B 30/56 359/629
2018/0065059 A1* 3/2018 Lee ......................... A63J 5/021
2018/0074375 A1* 3/2018 Koito ................ G02F 1/133504
2018/0081189 A1* 3/2018 Koito ..................... G02B 30/56
2018/0136730 A1* 5/2018 Hayashi .................. G06F 3/165
2018/0157049 A1* 6/2018 Houzyou ........... G03B 21/2006
2018/0164596 A1* 6/2018 Houzyou ........... G02B 27/0977
2018/0188549 A1* 7/2018 Frayne .................. G02B 30/25
2018/0203244 A1* 7/2018 Hatanaka ............... G02B 5/136
2018/0239190 A1* 8/2018 Numata ................. G02B 5/124
2018/0246337 A1* 8/2018 Makiguchi ............... G02B 5/12
2018/0259783 A1* 9/2018 Numata ............... G02B 27/283
2018/0259810 A1* 9/2018 Numata ............ G02F 1/133528
2018/0299686 A1* 10/2018 Xu ......................... G02B 5/128
2018/0341171 A1* 11/2018 Choi ...................... G03B 21/56
2019/0179062 A1* 6/2019 Nawata .................. G02B 30/56
2019/0196213 A1* 6/2019 Yamamoto ............. G02B 30/56
2019/0227489 A1 7/2019 Tokuchi
2019/0369409 A1* 12/2019 Yamada ................. G02B 30/56
2020/0012115 A1* 1/2020 Yamada ................. G02B 30/56
2020/0033618 A1* 1/2020 Li .......................... G02B 5/124
2020/0183183 A1* 6/2020 Oyama .................. G03B 21/26
2020/0201068 A1* 6/2020 Zhong .................... G02B 7/005
2021/0116718 A1* 4/2021 Makiguchi ........... G02B 27/281
2021/0141241 A1* 5/2021 Allio ...................... H04N 13/31
2021/0302758 A1* 9/2021 Smithwick ........... G02B 27/286
2021/0333699 A1* 10/2021 Peel ..................... H05B 47/115
2022/0043277 A1* 2/2022 Karafin .................. G02B 30/10
2022/0155614 A1* 5/2022 Kikuta ................. H04N 13/366
2022/0308347 A1* 9/2022 Ashimine .............. B60K 35/23
2022/0308695 A1* 9/2022 Hara ....................... G06F 3/011
2024/0280830 A1* 8/2024 Kikuta ................. G09G 3/3413
2025/0350717 A1* 11/2025 Lee ..................... H04N 13/383

* cited by examiner

DIRECTION F
3B
3A
112
901
100
C3B
S
101A
K'
X'
500b
21
500a
Z
C2B
X
K
Y
2
S
X
P
P
C1B
101B
106
1061
12
11
13
108
400
300
1

FIG. 12

DIRECTION F
3
3F
3E
112
100
901
106
C3A
S
C3B
C2A
S
P
P
C1A
1202E
101E
21
2
905
1302
C2B
1301
S
1202F
P
P
C1B
1061
108
101F
400
300
Z
X
Y
12
11
13
1

FIG. 14

DIRECTION F
500A
500B
3A
3B
112
100
4002
300
P
S
21
101A
905
2
101B
108
4001
400
1061
12
11
13
1
106
Z
Y
X 500B
500A
101A
101B
108
1061
12
11
13
106

3A
3B
112
100
300
4002
S
P
500F
101G
500E
101H
21A
2A
α
4001
400
1061
12
11
13
1
106
Z
Y
X 500F
101G
21A
2A
101H
500E
1061
12
11
13
106
Z
Y
X 600B
600A
101K or 101L
600D
600C

DIRECTION F
3
3A
300
3B
4002
600A
400
DIRECTION D
101K
4001
600A
112
100
12
108A
21A
2A
101L
108B
106
1061
DIRECTION E 700
3M
3L
112
100
4002
300
CIRCULAR POLARIZED LIGHT
LINEAR P POLARIZED LIGHT
S
21B
21A
2A
101R
905
101S
4001
400
1061
12
11
13
1
106
Z
Y
X

FIG. 27

AIR FLOATING VIDEO DISPLAY APPARATUS INCLUDING MULTI-LAYERED POLARIZATION SEPARATORS AND A CROSSTALK SHIELDING MEMBER

CROSS-REFERENCE TO RELATED APPLICATIONS

The present application claims priority from Japanese Patent Application No. 2022-196888 filed on Dec. 9, 2022, and Japanese Patent Application No. 2023-036798 filed on Mar. 9, 2023, the contents of each are hereby incorporated by reference into this application.

TECHNICAL FIELD

The present disclosure relates to a technique of an air floating video display apparatus.

BACKGROUND

As an example of an air floating video display apparatus, a video display apparatus and its display method of directly displaying videos as space images toward an outside are already known. Further, a detection system that reduces false detection caused by operations on an operation surface of the displayed space image is also disclosed in, for example, Japanese Patent Application Laid-open No. 2019-128722 (Patent Document 1).

SUMMARY

However, in the air floating video display apparatus of Patent Document 1, a specific technique for displaying air floating videos as a three-dimensional shape has not been sufficiently considered.

Therefore, an object of the present disclosure is to provide a suitable technique for making the stereoscopically visible air floating videos displayable by providing a plurality of layers regarding the air floating video display apparatus.

To solve the above-mentioned problem, for example, a configuration described by a scope of patent claims is adopted. The present application includes a plurality of measures for solving the problem, but if one example is raised, it is as follows. An air floating video display apparatus according to one embodiment includes a display panel that displays a video, a retroreflector that reflects the video light from the display panel and forms an air floating video in air by the reflected light, and a polarization separator arranged between the display panel and the retroreflector at a predetermined angle with respect to the display panel, and the retroreflector is arranged to face the display panel obliquely at a predetermined angle.

According to a typical embodiment of the present invention, a more suitable air floating video display apparatus can be realized. The above-mentioned problems, problems other than the above, configurations for solving these problems, effects, and the like will be made clear by the description of the embodiments below.

DRAWINGS

FIG. 5 is a characteristic diagram showing a relationship between surface roughness of the retroreflector and a blur amount of a retroreflection image (air floating image);

FIG. 9 is a diagram for explaining an example of generation of an unnecessary air floating video in an air floating video display apparatus of a comparative example of the embodiment (first embodiment);

FIG. 12 is a diagram showing a cross-sectional configuration example of an air floating video display apparatus according to one embodiment (fourth embodiment) when viewed from a side;

FIG. 14 is a supplementary explanatory diagram of a step difference between two beam splitters in the air floating video display apparatus according to the example (first example);

FIG. 27 is a diagram showing a cross-sectional configuration example of an air floating video display apparatus according to one example (thirteenth example) when viewed from a side.

PREFERRED EMBODIMENTS

Figure 1A:
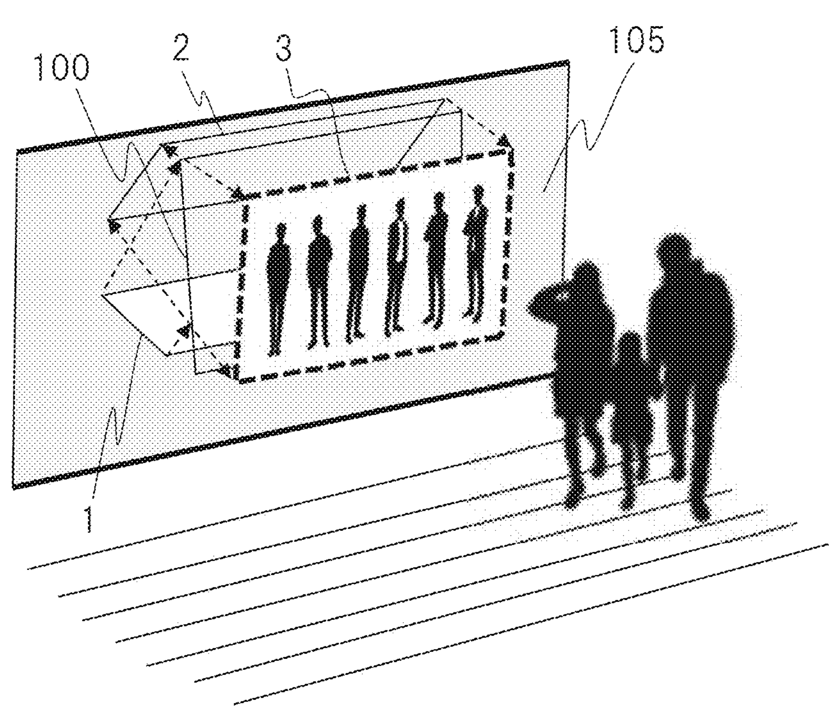
FIG. 1A is a diagram showing one example of a usage pattern of an air floating video display apparatus according to one embodiment.

Embodiments of the present disclosure will be described in detail below with reference to the drawings. In the drawings, the same parts are denoted by the same reference numerals in principle, and a repetitive description thereof will be omitted. In the drawings, the representation of each component may not represent its actual position, size, shape, range, and the like in order to facilitate understanding of the invention. For the purpose of explanation, in explaining processing by a program, the program, function, processing unit, and the like are sometimes explained as a main body, but a main body as hardware for these is a processor or a controller made up of the processor and the like, equipment, computers, systems, and the like. The computer executes processing according to a program read onto a memory while appropriately using resources such as a memory and a communication interface by the processor. Thus, predetermined functions, processing units, and the like are realized. The processor is composed of, for example, a semiconductor apparatus such as a CPU/MPU or a GPU. The processor is composed of apparatus and circuits that can perform predetermined operations. The processing is not limited to software program processing, and can also be implemented by using a dedicated circuit. As the dedicated circuit, FPGA, ASIC, CPLD, and the like can be applied. The program may be installed as data in the target computer in advance, or may be distributed as data from a program source to the target computer and be installed. The program source may be a program distribution server on a communication network, or may be a non-transitory computer-readable storage medium such as a memory card or a disk. The program may be composed of multiple modules. A computer system may be configured by multiple apparatuses. The computer system may be configured with a client/server system, a cloud computing system, and the like. Various types of data and information are configured, for example, in a structure such as a table or a list, but are not limited thereto. Expressions of identification information, identifiers, IDs, names, numbers, and the like can be replaced with each other.

Embodiment

An air floating video display apparatus according to an embodiment is configured to include a video display apparatus, a beam splitter which is a polarization separation member, and a retroreflector in which a λ/4 plate (retardation plate, quarter wavelength plate) is provided on a retroreflection surface. The video display apparatus is configured to include a light source apparatus and a display panel or liquid crystal display panel that emits video light of a specific polarization (for example, P-polarized light) as a video source (video display element). The light source apparatus generates and supplies light as a backlight to the liquid crystal display panel. A polarization separation member is arranged in a space connecting the liquid crystal display panel of the video display apparatus and the retroreflector. The polarization separation member is configured to have such properties as to transmit the video light of the specific polarization from the liquid crystal display panel toward the retroreflector and reflect video light of the other polarization (for example, S-polarized light) after polarization conversion by the retroreflector and the λ/4 plate. The video light of the other polarization after the reflection generates and displays an air floating video, which is a real image, at a predetermined position in a direction different from that of the video display apparatus.

The video display apparatus may be provided with a polarization convertor that aligns light source light from the light source apparatus to polarization in a specific direction in order to improve contrast performance of the air floating video. For example, the light source apparatus includes a point-like or planar light source, an optical element unit that reduces a divergence angle of light from the light source, and a polarization convertor (polarization conversion element) that aligns the light from the light source with the polarization in a specific direction, and a light guide body having a reflection surface that propagates the light from the light source to the liquid crystal display panel, and controls a video luminous flux of the video light from the liquid crystal display panel by a shape and surface roughness of the reflection surface of the light guide body.

The air floating video display apparatus of the embodiment is considered to be used particularly indoors although not limited, and is configured to include a video display apparatus portion having a casing that can be installed on a desk, and a air floating video display portion having a frame structure.

The video display apparatus portion is configured to mainly include a liquid crystal display panel and a light source (backlight).

The air floating video display portion is configured to have an optical system composed of a polarization separator, a retroreflector, and the like. The optical system of the present embodiment has a structure supported by a frame made of grooves, metal, resins, or the like.

[Air Floating Video Display Apparatus]

The following embodiments relate to, for example, an air floating video display apparatus in which a video generated by video light from a large-area video emission light source is transmitted via a transparent member of glass of a shop window and the like partitioning a space and is displayable as an air floating video inside or outside a store space. Further, separately from the above-mentioned embodiments, the present disclosure relates to an air floating video display apparatus in which a video generated by video light from a video light emission source having a smaller area (for example, about 2 to 5 inches) is provided for displaying an air floating video mainly indoors by using an optical system composed of a polarization separator (in other words, a polarization beam splitter or simply a beam splitter), a retroreflection plate, and the like.

Note that, in the following description of the embodiments, a video floating in a space is expressed by using the term "air floating video". Instead of this term, it may be expressed as "aerial video", "aerial floating video", "air floating optical image of a display image", "aerial floating optical image of a display image", and the like. The term "air floating video" used in the description of the embodiment is used as a representative example of these terms.

According to the following embodiments, for example, video information having high resolution becomes displayable on a glass surface of the show window or on a plate member having light transmittance in a state of floating in the space. Further, the air floating video display apparatus of the embodiment is installable in a relatively small space such as on a desk in a study, on a table in a living room, or at a kitchen counter.

An air floating video display apparatus of a conventional technique example uses an organic EL panel or a liquid crystal display panel as a high-resolution color display video source in combination with a retroreflector. In the air floating video display apparatus of the conventional technique example, video light is diffused over a wide angle, so that the following problems arises.

Figure 4A:
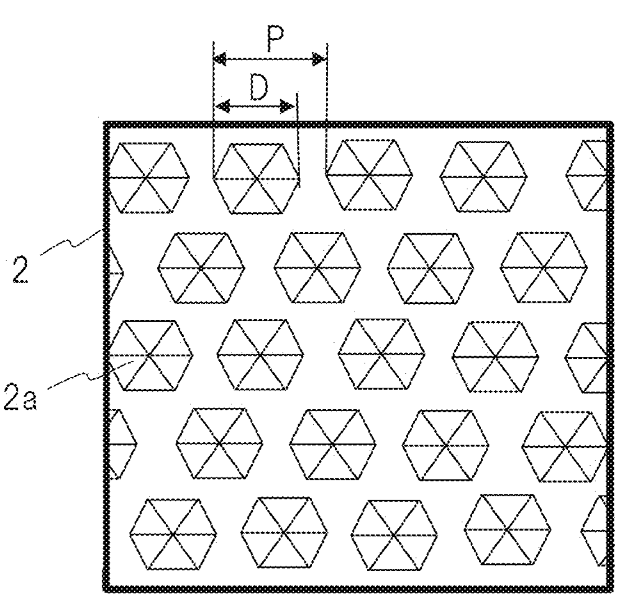
FIG. 4A is a diagram showing an example of a detailed structure of a retroreflector.
Figure 4B:
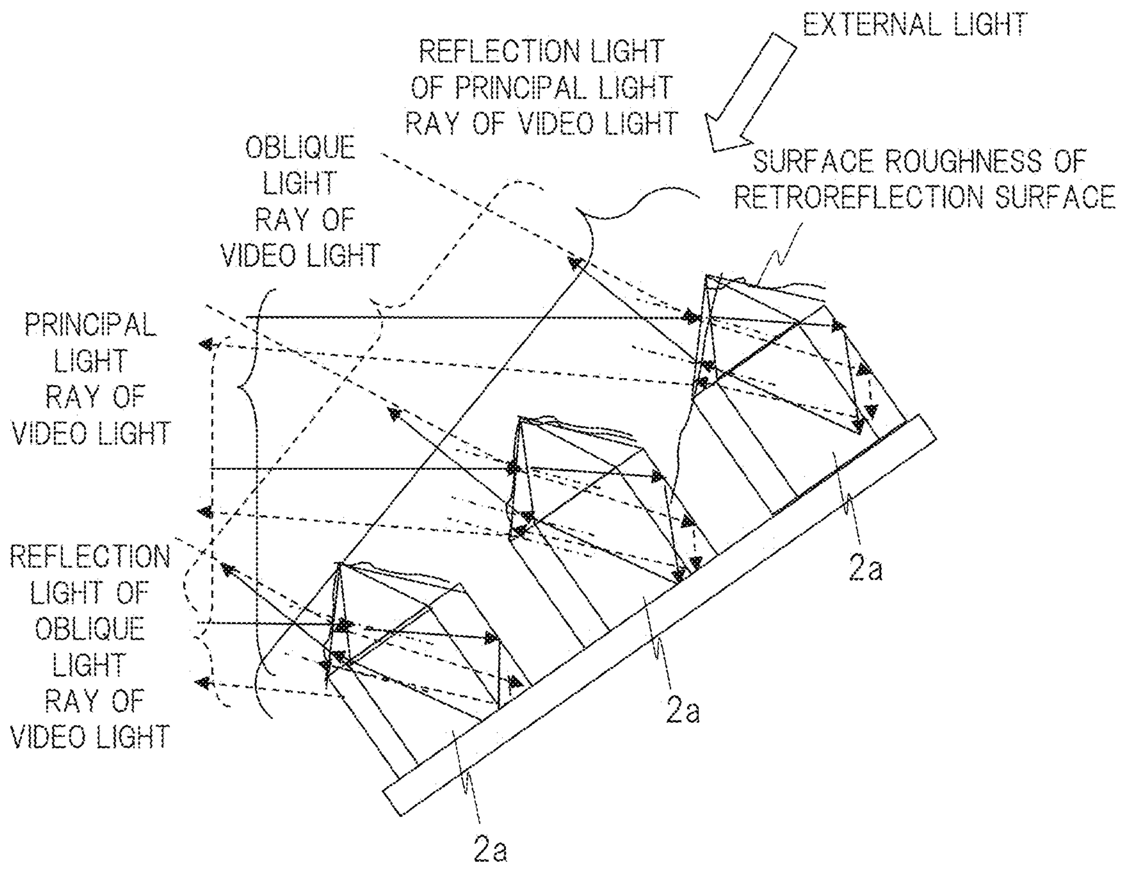
FIG. 4B is a diagram showing an example of a detailed structure of a retroreflector.

As shown in FIGS. 4A and 4B, a problem arises about the retroreflector 2 in that since a retroreflection portion 2*a* is a hexahedron, a ghost image is generated by the video light incident obliquely on the retroreflector 2 besides normally reflected reflection light and image quality of the air floating video is degraded. The retroreflector 2 is also called a retroreflection plate, a retroreflection sheet, or the like.

Figure 5:
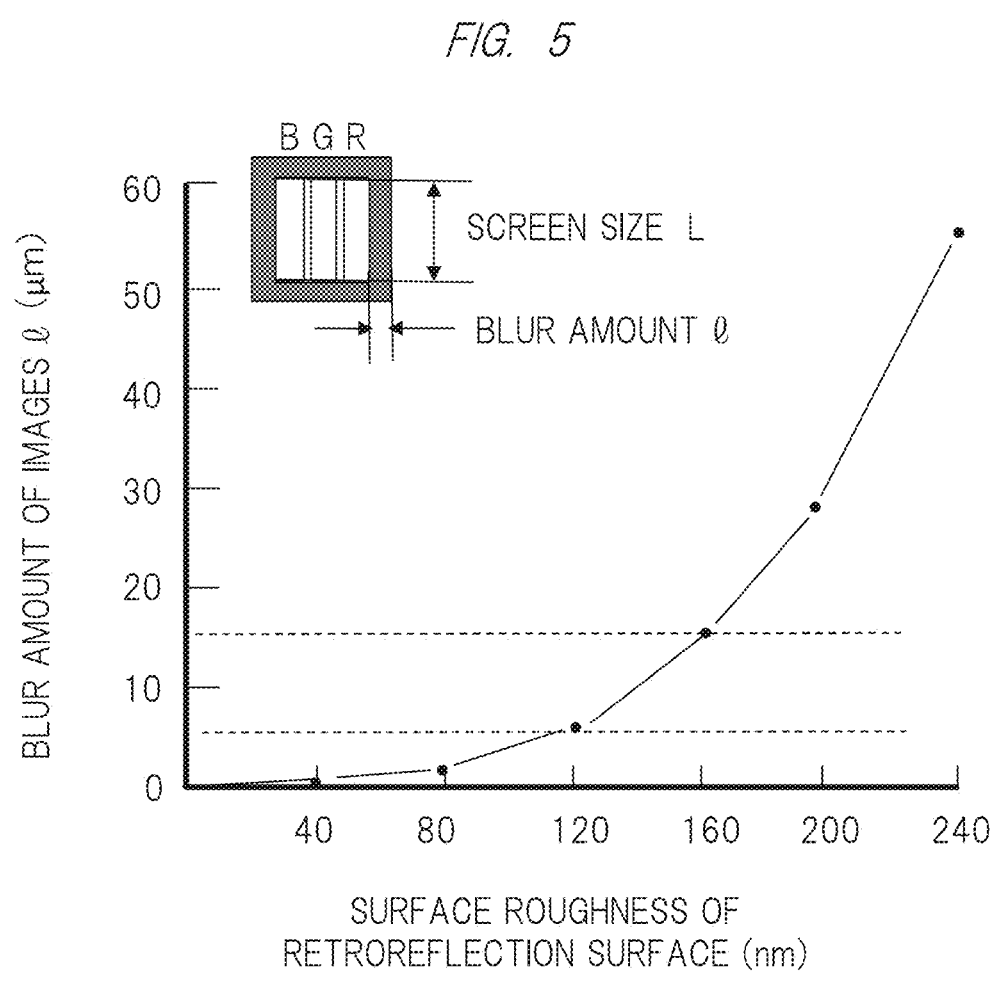

In addition, as shown in FIG. 5, a problem also arises in that the air floating video obtained by reflecting the video light from the video display apparatus, which is a video source, causes a blur for each pixel of the liquid crystal display panel besides the above-mentioned ghost image.

Figure 1B:
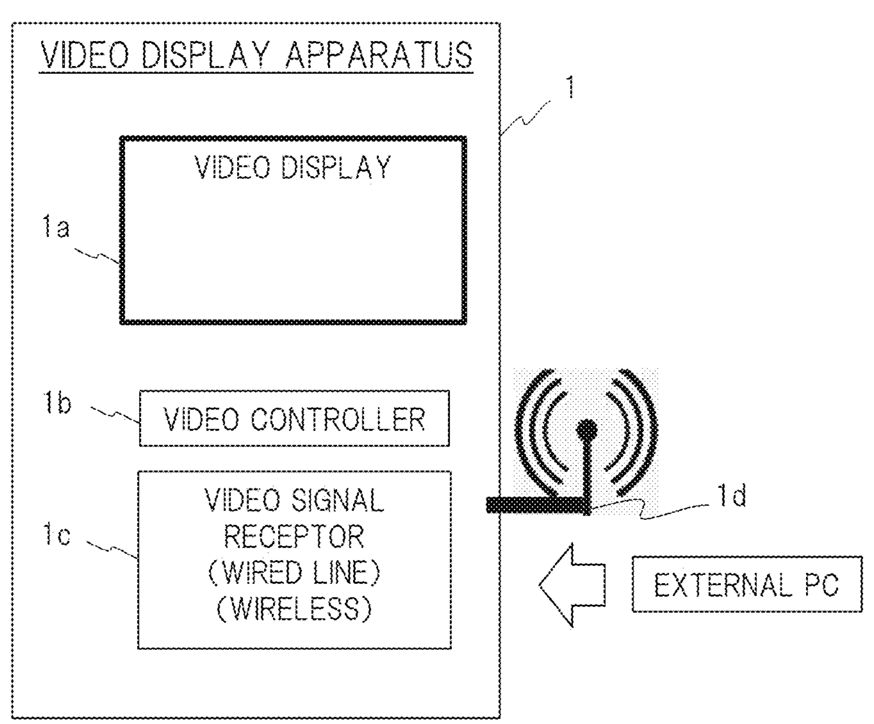
FIG. 1B is a diagram showing one example of a usage pattern of an air floating video display apparatus according to one embodiment.

FIGS. 1A and 1B each show one example of a usage pattern and a configuration example of an air floating video display apparatus according to one embodiment. FIG. 1A shows an overall configuration of an air floating video display apparatus according to the present embodiment. For example, in a store or the like, a space is partitioned by a show window (window glass) 105 that is a light-transmissive member (also referred to as a transparent member) such as glass. According to an air floating information display apparatus of the present embodiment, light transmits such a transparent member and can display an air floating video in one direction to an outside of the store space. Specifically, light with a narrow directional characteristic and a specific polarization is emitted as a video light flux from the video display apparatus 1 in the air floating information display apparatus, once enters the retroreflector 2, and is retroreflected, transmits the window glass 105, and forms the air floating video 3, which is a real image, outside the space in the store. FIG. 1A shows a case where, in a depth direction, a back side of the window glass 105 is an in-store space and a front side is an out-store space (for example, a sidewalk) with respect to the window glass 105. On the other hand, providing means (an optical member or the like) for reflecting a specific polarized wave to the window glass 105 also makes it possible to reflect the video light flux and form the air floating video 3 at a desired position in the store.

FIG. 1B shows a block configuration of the video display apparatus 1 described above. The video display apparatus 1 includes a video display portion 1*a* that displays an original image of the air floating video 3, a video controller 1*b* that converts the inputted video according to resolution of a panel of the video display portion 1*a*, a video signal receiver that receives a video signal, and a reception antenna 1*d*. The video signal receiver 1*c* supports wired input signals such as a USB (Universal Serial Bus: registered trademark) input and a HDMI (High-Definition Multimedia Interface: registered trademark) input, and supports a wireless input signal such as a Wi-Fi (Wireless Fidelity: registered trademark) input. The video display apparatus 1 functions independently as a video reception/display apparatus, and can also display video information from an external PC, a tablet, a smartphone, or the like. Furthermore, the video display apparatus 1 can be provided with capabilities such as a calculation processing and a video analysis processing if connecting a stick PC or the like.

[Air Floating Video Display Apparatus V Type]

Figure 2:
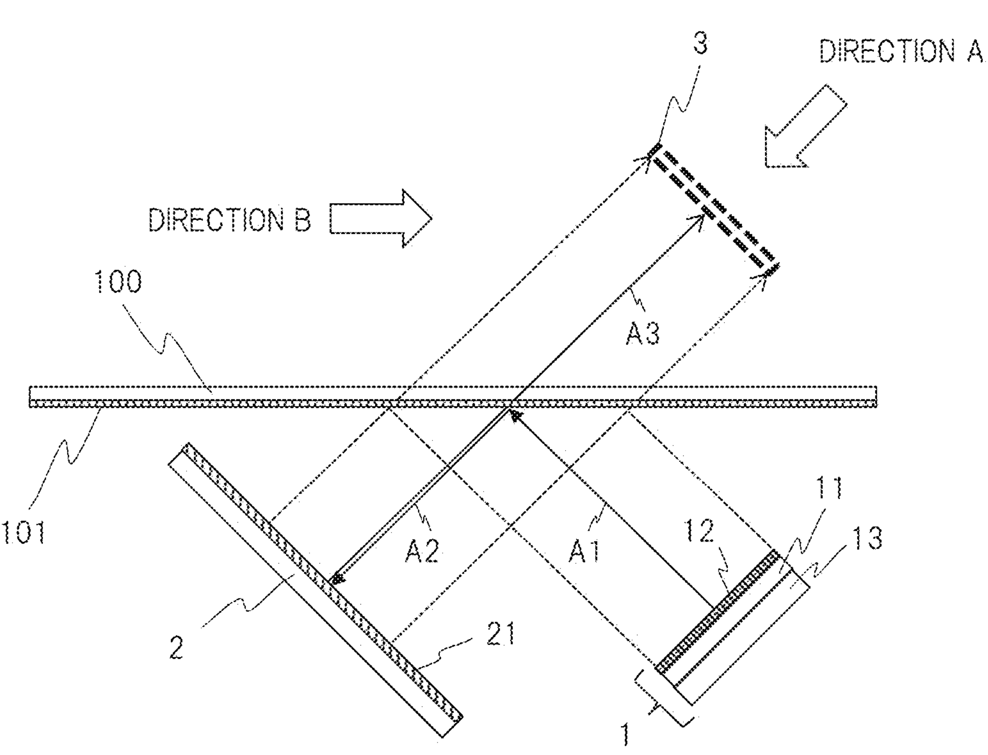
FIG. 2 is a diagram showing a V-shaped configuration as one example of a configuration of main parts of the air floating video display apparatus according to the embodiment.

FIG. 2 shows a configuration example of main parts of an air floating video display apparatus according to one embodiment. The embodiment shown in FIG. 2 shows a configuration in which the video display apparatus 1 and the retroreflector (in other words, retroreflection plate) 2 are arranged in a substantially V-shape type (hereinafter referred to as a V type). As shown in FIG. 2, a V type configuration has the video display apparatus 1 that generates the video light with the specific polarized wave in an oblique direction (direction corresponding to an optical axis A1) with respect to the transparent member 100 such as a flat glass (arranged horizontally in this example). Further, the V type configuration has the retroreflector 2 in another oblique direction (direction corresponding to an optical axis A2) with respect to the transparent member 100 such as flat glass. The video display apparatus 1 is configured by a light source apparatus 13, a liquid crystal display panel 11 which is a liquid crystal display element, an absorption type polarization plate 12, and the like.

In FIG. 2, the video light with the specific polarized wave, which is emitted from the liquid crystal display panel 11 of the video display apparatus 1, travels in the direction of the optical axis A1, is reflected by a beam splitter 101 (polarization separator) having a membrane selectively reflecting the video light with the specific polarized wave which is provided on the transparent member 100, travels in the direction of the optical axis A2, and is incident on the retroreflector 2. In this example, the beam splitter 101 is formed into a sheet shape and is adhered to a lower surface of the transparent member 100 such as flat glass. Alternatively, the beam splitter 101 may be formed by directly depositing an optical thin film on the flat glass.

A λ/4 plate 21 is provided on a video light incidence surface (in other words, retroreflection surface) of the retroreflector. In other words, the λ/4 plate 21 is a polarization conversion element, a phase difference plate, and a quarter wavelength plate.

The video light on the optical axis A2 from the beam splitter 101 is caused to pass through the λ/4 plate 21 twice, that is, when being incident on the retroreflector 2 and when being emitted from the retroreflector 2, thereby being caused to perform polarization conversion from the specific polarized wave (one polarized wave) to the other polarized wave. Here, the beam splitter 101 that selectively reflects the video light with the specific polarized wave has properties of transmitting the video light of the other polarized wave after the polarization conversion. Therefore, the video light of the other polarized wave after the polarization conversion transmits the beam splitter 101. The video light transmitting the beam splitter 101 forms and displays the air floating video 3, which is a real image, at a predetermined position outside the transparent member 100 in a direction of an optical axis A3 corresponding to the optical axis A2.

Note that the light forming the air floating video 3 is a collection of light rays that converge from the retroreflector 2 to an optical image of the air floating video 3, and these light rays continue to travel straight even after passing through the optical image of the air floating video 3. Therefore, in the configuration of FIG. 2, when a user visually recognizes the air floating video from a direction A indicated by an arrow corresponding to the optical axis A3, the air floating video 3 is visually recognized as a bright video. However, when another person visually recognizes the air floating video from a direction B indicated by an arrow, for example, the air floating video 3 cannot be visually recognized as a video at all. Such characteristics are very suitable when systems or the like that display videos requiring high security or highly confidential videos that should be kept secret from a person(s) directly facing the user are adopted.

Note that depending on performance of the retroreflector 2, polarization axes of the reflected video light may become uneven. In this case, some of the video light whose polarization axes become uneven is reflected by the beam splitter 101 described above and returns to the video display apparatus 1. When this returned light is reflected again on the video display surface of the liquid crystal display panel 11 configuring the video display apparatus 1, the ghost image may be generated and the image quality of the air floating video 3 may be degraded. Therefore, in this embodiment, an absorption type polarizer 12 is provided on the video display surface of the video display apparatus 1. The video light emitted from the video display apparatus 1 is caused to transmit the absorption type polarizer 12, and the reflection light returning from the beam splitter 101 is caused to be absorbed by the absorption type polarizer 12. This makes it possible to suppress the above-mentioned retroreflection and prevent the image quality deterioration due to the ghost image of the air floating video 3.

The beam splitter (polarization separator) 101 described above is formed by, for example, a reflective polarizer or a metal multilayer film that reflects a specific polarized wave. More specifically, the beam splitter 101 can be configured by depositing an optical thin film on flat glass (for example, quartz glass).

[Air Floating Video Display Apparatus Z Type]

Figure 3:
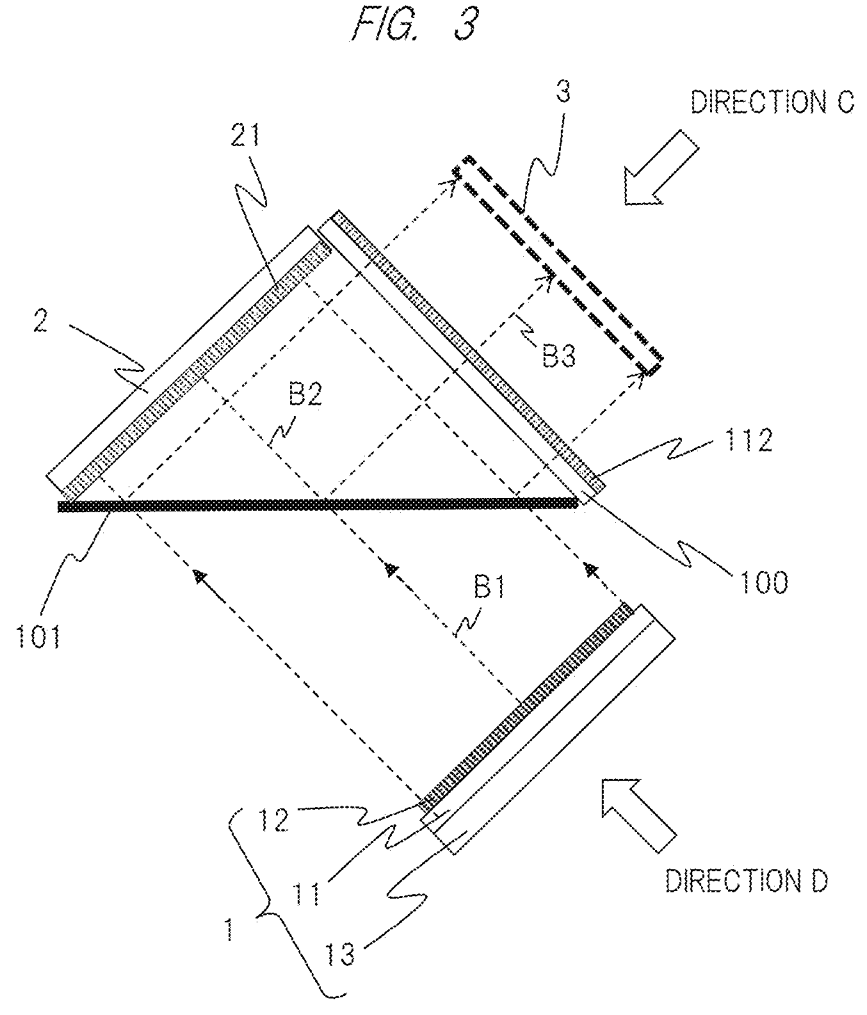
FIG. 3 is a diagram showing a Z-shaped configuration as one example of the configuration of the main parts of the air floating video display apparatus according to the embodiment.

FIG. 3 shows a configuration example of a main part of a floating video display apparatus according to the embodiment, which is different from the embodiment shown in FIG. 2. The embodiment shown in FIG. 3 shows a configuration in which: the video display apparatus 1 and the retroreflector 2 (retroreflection plate) are arranged so as to oppose each other; and the beam splitter 101 is arranged schematically in a Z-shape type (or inverted Z-shape type) so as to mutually have an angle of about 45 degrees with respect to each other in a space connecting both (hereinafter referred to as a Z type).

In the Z-type configuration shown in FIG. 3, the transparent member 100 such as a glass plate and an absorption type polarization plate 112 is provided as an object of reducing an influence on the retroreflector 2 and the video display apparatus 1 of exterior light incident from a direction C. As shown in FIG. 3, the video display apparatus 1 and the retroreflector 2 are arranged at an angle of about 90 degrees with respect to the transparent member 100 and the absorption type polarization plate 112, and are arranged at an angle of about 45 degrees with respect to the beam splitter 101. In this embodiment, the beam splitter 101 is arranged horizontally, and a position of the video displayed on the video display apparatus 1, more specifically, the liquid crystal display panel 11, and a position at which the air floating video 3 is formed have a plane-symmetric position relationship of plane symmetry with respect to the beam splitter 101.

[Retroreflector]

FIG. 4A shows a surface shape of the retroreflector 2 (retroreflection plate) manufactured by Nippon Carbide Industries Co., Ltd. used in this study as a typical retroreflector 2. FIG. 4A shows a top view, and FIG. 4B shows a side view. On a surface of the retroreflector 2, the retroreflector has the retroreflection portion (retroreflection element) 2*a* made up of regularly arranged hexagonal columns. A light beam incident into an interior of the retroreflection portion 2*a* is reflected by wall surfaces and bottom surfaces of the hexagonal prism, and is emitted as retroreflection light in a direction corresponding to incident light. This emitted light×forms the air floating video 3 as a regular reflection image (regular image), for example, for the configurations shown in FIGS. 2 and 3. Meanwhile, as shown in FIG. 4B, some of the video light from the video display apparatus 1, which is obliquely incident on the retroreflector 2, forms the ghost image (not shown) at a position different from a normal image. This ghost image reduces the visibility of the air floating video 3.

Therefore, in this embodiment (FIG. 3), based on the video displayed on the video display apparatus 1, the air floating video 3, which is a real image, is displayed without forming the ghost image. The resolution of this air floating video 3 largely depends on an outer diameter D and a pitch P of the retroreflection portion 2*a* of the retroreflector 2 shown in FIG. 4A besides the resolution of the liquid crystal display panel 11. For example, in a case of using a 7-inch WUXGA (1920×1200 pixels) liquid crystal display panel 11, for example, even if one pixel (one triplet) is about 80

μm, one pixel of the air floating video 3 is equivalent to 300 μm when the diameter D of the retroreflection portion 2*a* is 240 μm and the pitch P is 300 μm. Consequently, the effective resolution of the air floating video 3 is reduced to about ⅓. Therefore, in order to make the resolution of the air floating video 3 equivalent to that of the video display apparatus 1, it is desirable to make the diameter D and the pitch P of the retroreflection portion 2*a* close to one pixel of the liquid crystal display panel. On the other hand, in order to suppress the occurrence of moiré due to the pixels of the retroreflector 2 and the liquid crystal display panel 11, it is preferable to design a pitch ratio of each of them so as to be outside an integral multiple of one pixel. Further, a shape is preferably a shape arranged so that none of sides of the retroreflection portion 2*a* overlaps any one side of one pixel of the liquid crystal display panel 11.

The present inventor(s) has obtained a relationship between a blur amount 1 (small L) and a pixel size L (large L) of the image of the air floating video 3, which is permissible in order to improve the visibility, through experiments by creating the video display apparatus 1 in combination with the liquid crystal display panel 11 with a pixel pitch of 40 μm and the light source apparatus 13 having a narrow divergence angle (divergence angle of 15°) of this example. FIG. 5 shows a result of the experiments. It is found that; the blur amount l deteriorating the visibility is desirably 40% or less of the pixel size and is hardly noticeable if it is 15% or less and the surface roughness of the reflection surface for which this blur amount l becomes an acceptable level is that average roughness is 160 nm or less within a range of a measurement distance of 40 μm; and, in order to make the blur amount l less noticeable, the surface roughness of the reflection surface is desirably 120 nm or less. For this reason, it is desirable to reduce the surface roughness of the retroreflector 2 described above and to make the surface roughness including a reflection film forming the reflection surface and its protective film the above-mentioned value or less.

Meanwhile, in order to manufacture the retroreflector 2 at low cost, it is preferable to mold it by using a roll press method. Specifically, this is a method in which the retroreflection portions 2*a* are aligned and shaped on a film. In this method, a reverse shape of a shape to be shaped is formed on a roll surface, an ultraviolet curing resin is applied on a fixing base material, and the resin is passed between the rolls to form the required shape and is irradiated with an ultraviolet and cured to obtain the retroreflector 2 having a desired shape.

In the video display apparatus 1 of this embodiment, by the liquid crystal display panel 11 and the light source apparatus 13 (details shown in FIG. 6) as a light source that generates light of a specific polarized wave, the possibility that the video light is incident obliquely with respect to the above-mentioned retroreflector 2 becomes low. As a result, a structurally superior system is obtained in which the generation of the ghost images is suppressed and even if the ghost image occurs, luminance of the ghost image is low.

Meanwhile, in the configuration of the Z-type air floating video display apparatus shown in FIG. 3, the video display apparatus 1 configured so as to have the liquid crystal display panel 11, the absorption type polarization plate 12, and the light source apparatus 13 is arranged with a predetermined angle (for example, an angle of about 45 degrees with respect to the horizontal beam splitter 101). The video light from the video display apparatus 1 passes through the beam splitter 101 in a direction of the optical axis B1 (oblique direction with respect to the beam splitter 101), and proceeds toward the retroreflector 2 in a direction of the optical axis B2 (corresponding to a direction D).

Here, the video light from the video display apparatus 1 is light with a specific polarized wave, for example, video light having characteristics of P polarization (parallel polarization). Further, the beam splitter 101 is a polarization separator like a reflection type polarization plate and transmits the P-polarized video light from the video display apparatus 1, but has properties of reflecting an S-polarized (Senkrecht Polarization) video light. This beam splitter 101 is formed from a reflection type polarization plate or a metal multilayer film that reflects a specific polarized wave. This beam splitter 101 can generally be formed by depositing an optical thin film on a flat glass substrate. Therefore, refractive index of the beam splitter 101 has substantially the same value as the refractive index n (n≈1.5) of flat glass.

Meanwhile, the λ/4 plate 21 is provided on a light incidence surface (retroreflection surface) of the retroreflector 2. The P-polarized video light that has passed through the beam splitter 101 from the video display apparatus 1 passes through the λ/4 plate 21 twice in total when being incident on and being emitted from the retroreflector 2, thereby performing the polarization-conversion of the P-polarized light into the S-polarized light. As a result, the S-polarized video light after the polarization conversion from the retroreflector 2 is reflected by the beam splitter 101 and proceeds toward the transparent member 100 and the like. The S-polarized video light that has traveled in a direction corresponding to the optical axis B3 after the reflection (oblique direction with respect to the beam splitter 101) transmits the transparent member 100 made of a glass plate and the like and the absorption type polarization plate 112, and generates and displays the air floating video 3, which is a real image, at a predetermined position outside the transparent member 100 and the like.

Here, in order to reduce image quality deterioration due to incidence of sunlight and illumination light with respect to the optical system configured by optical components such as the video display apparatus 1, the retroreflector 2, and the beam splitter 101, it is preferable to provide the absorption type polarization plate 112 on an outer surface of the transparent member 100. Since the polarization axes may become misaligned due to retroreflection of the light by the retroreflector 2, some of the video light may be reflected by the beam splitter 101 and returned to the video display apparatus 1. This returned light is reflected again on a video display surface of the liquid crystal display panel 11 configuring the video display apparatus 1, thereby generating the ghost image and significantly degrading the image quality of the air floating video 3.

Therefore, even in both embodiments shown in FIGS. 2 and 3, the absorption type polarization plate 12 is provided on the video display surface of the video display apparatus 1. Alternatively, an anti-reflection film (not shown) may be provided on a video emission side surface of the absorption type polarization plate 12 provided on the surface of the video display apparatus 1. Consequently, the absorption type polarization plate 12 absorbs the light that causes the ghost image, thereby preventing the image quality deterioration of the air floating video 3 due to the ghost image.

Furthermore, in the Z-type configuration shown in FIG. 3, when external light is directly incident on the retroreflector 2, a strong ghost image is generated. consequently, in order to suppress and prevent the occurrence of this ghost image, this embodiment has a configuration in which the retroreflector 2 is tilted downward with respect to an incident direction of the external light, thereby blocking the incidence of the external light. Specifically, a main incident direction of the external light is set to be a direction (oblique direction such as optical axis B3) corresponding to a direction C (direction in which the user visually recognizes the air floating video 3 from a front) shown by an arrow. In that case, the retroreflector 2 is arranged so that the optical axis B2 has a relationship of an angle of, for example, about 90 degrees with respect to the direction C (optical axis B3). In other words, a main surface of the retroreflector 2 is arranged so as to have a relationship of the angle of, for example, about 90 degrees with respect to the main surface of the transparent member 100 and the like. Consequently, the external light incident in the direction C is not directly incident on the main surface (retroreflection surface) of the retroreflector 2, so that the generation of the ghost images is prevented.

Furthermore, the video display apparatus 1 is also arranged in a direction different from the incident direction (direction C) of the external light. Specifically, the main surface (video light emission surface) of the video display apparatus 1 is arranged in the same direction (in other words, parallel) as the main surface of the retroreflector 2, and the optical axis B1 of the video display apparatus 1 is arranged so as to have a relationship of the angle of about 90 degrees with respect to the optical axis B3 corresponding to the incident direction (direction C) of the external light. Further, when a range of luminous flux is considered in a case where the external light is incident in the direction C with respect to the main surface of the transparent member 100 functioning as an opening, the video display apparatus 1 is arranged at a position slightly away from an outside of the range. These reduce the occurrence of the ghost images caused by the re-reflection on the video display apparatus 1.

[Video Display Apparatus]

Figure 6:
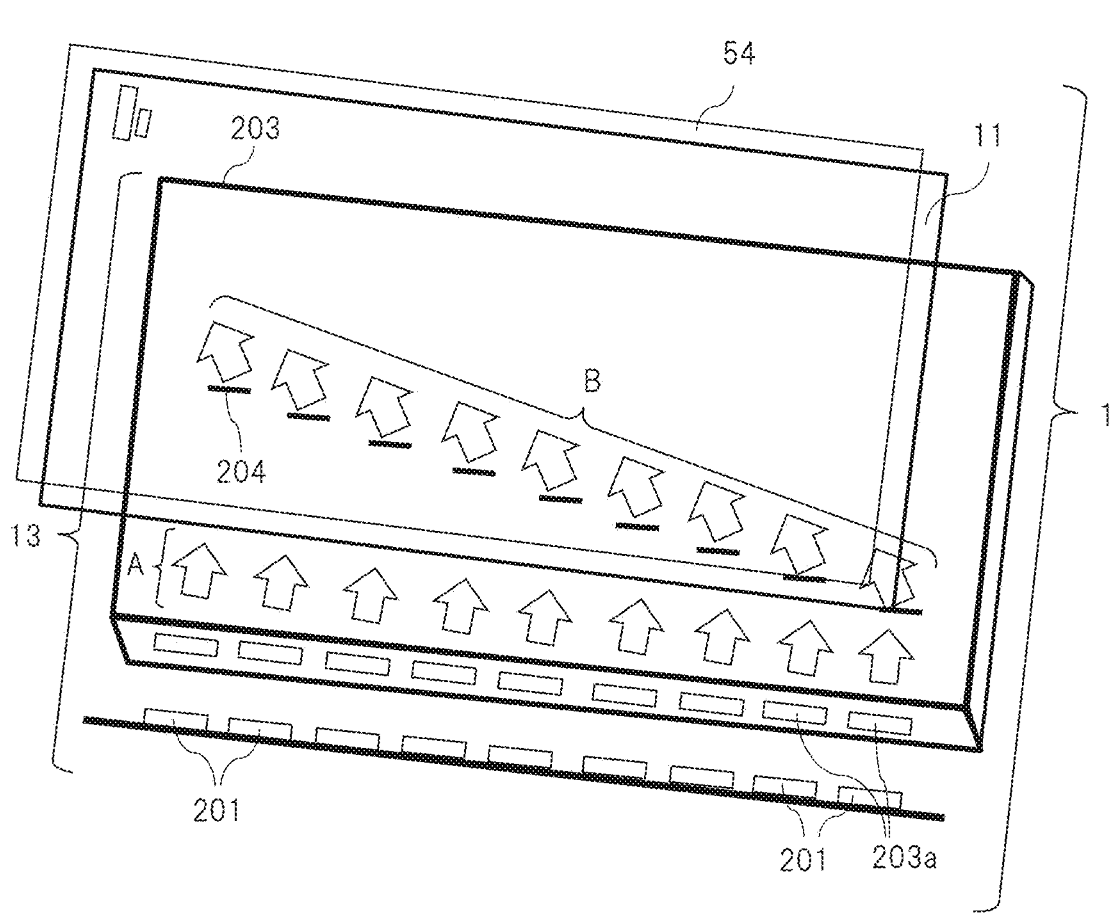
FIG. 6 is a diagram showing a configuration example of a video display apparatus according to the embodiment.

FIG. 6 shows a configuration example of a video display apparatus 1 that is applicable to the embodiments of FIGS. 2 and 3. The video display apparatus 1 is configured so as to include the light source apparatus 13, the liquid crystal display panel 11, a light direction conversion panel 54, and the like. The above-mentioned absorption type polarization plate 12 may be provided on a video emission surface side of the liquid crystal display panel 11. The light source apparatus 13 is configured so as to include: a plurality of LED elements 201 (LEDs: Light Emitting Diodes) that are semiconductor light sources (solid light sources) configuring a light source; a light guide body 203; and the like. FIG. 6 shows, as a developed perspective view, a state in which the liquid crystal display panel 11 and the light direction conversion panel 54 are arranged on the light emission side of the light source apparatus 13.

The light source apparatus 13 is formed of, for example, a case (not shown) made of plastic or the like, and is configured so as to accommodate the LED element 201 and the light guide body 203 therein. A light receiving end surface 203*a* is provided on a light incidence side of the light guide body 203 in order to convert the divergence light from each LED element 201 into a substantially parallel light beam. The light receiving end surface 203*a* has such a shape that a cross-sectional area gradually increases toward a face-to-face direction with respect to the light receptor, and a lens shape having such an effect that the divergence angle gradually decreases by being totally reflected multiple times while propagating therein is provided.

Further, the liquid crystal display panel 11 arranged substantially parallel to the light guide body 203 is attached to an upper surface of the light guide body 203. The upper surface of the light guide body 203 serves as an emission surface from which the light reflected by the light guide body 203 is emitted. Moreover, the plurality of LED elements 201 are attached to one side surface (lower side surface in FIG. 6) of the case of the light source apparatus 13. The light from the plurality of LED elements 201 is converted into substantially collimated light (substantially parallel light) depending on the shape of the light receiving end surface 203*a* of the light guide body 203. Consequently, the light receptor of the light receiving end surface 203*a* and the LED elements 201 are attached while maintaining a predetermined positional relationship.

The light source apparatus 13 is configured by attaching a light source unit, in which a plurality of LED elements 201 serving as a light source are arranged, to the light receiving end surface 203*a*, which is the light receptor provided on the light incidence side of the light guide body 203. The diverging light flux from the LED elements 201 is made into approximately collimated light depending on the lens shape of the light receiving end surface 203*a* of the light guide body 203. This approximately collimated light is guided inside the light guide body 203 in a direction A indicated by an arrow. The direction A is a direction substantially parallel to the liquid crystal display panel 11 (direction from bottom to top in the drawing). The light guided in the direction A has its luminous flux direction converted by a luminous flux direction convertor 204 provided in the light guide body 203, and is emitted in the direction B shown by the arrow toward the liquid crystal display panel 11 which is substantially parallel to the light guide body 203. The direction B is a direction substantially perpendicular to the display surface of the liquid crystal display panel 11.

The light guide body 203 has a configuration in which a distribution (in other words, density) of the luminous flux direction convertors 204 is optimized depending on the shape of the inside or the surface of the light guide body 203. This makes it possible to control uniformity of light, which is emission luminous flux from the light source apparatus 13 shown in the direction B and is incidence luminous flux on the liquid crystal display panel 11.

Further, in the video display apparatus 1 including the light source apparatus 13 and the liquid crystal display panel 11, in order to improve utilization efficiency of the emission luminous flux from the light source apparatus 13 shown in direction B and to significantly reduce power consumption, directivity of the light in the direction B from the light source apparatus 13 can also be controlled. More specifically, the light source apparatus 13 can be configured as a light source having a narrow divergence angle. As a result, the video light from the video display apparatus 1 efficiently reaches a viewer(s) with high directivity (in other words, rectilinear properties) like laser light, and can display high-quality air floating videos with high resolution. At the same time, the power consumption by the video display apparatus 1 including the LED elements 201 of the light source apparatus 13 can be significantly reduced.

In addition, the video display apparatus is configured so that the liquid crystal display panel 11 attached to the frame, a flexible wiring substrate (FPC: Flexible Printed Circuits) electrically connected to the liquid crystal display panel 11, and the like are attached to a frame (not shown) of the liquid crystal display panel 11 attached to an upper surface of the case (not shown) of the light source apparatus 13. The liquid crystal display panel 11, which is a liquid crystal display element, generates a display image(s) by modulating an intensity of transmission light, together with the LED elements 201 based on a control signal from a control circuit (not shown) that configures an electronic apparatus.

<Desk-Installed Type (Z-Type) Air Floating Video Display Apparatus>

Next, a desk-installed type air floating video display apparatus according to one embodiment will be described with reference to FIG. 7 and subsequent figures. The air floating video display apparatus of each embodiment subsequently shown corresponds to a Z-type configuration shown in FIG. 3 as a basic configuration.

First Embodiment

Figure 7:
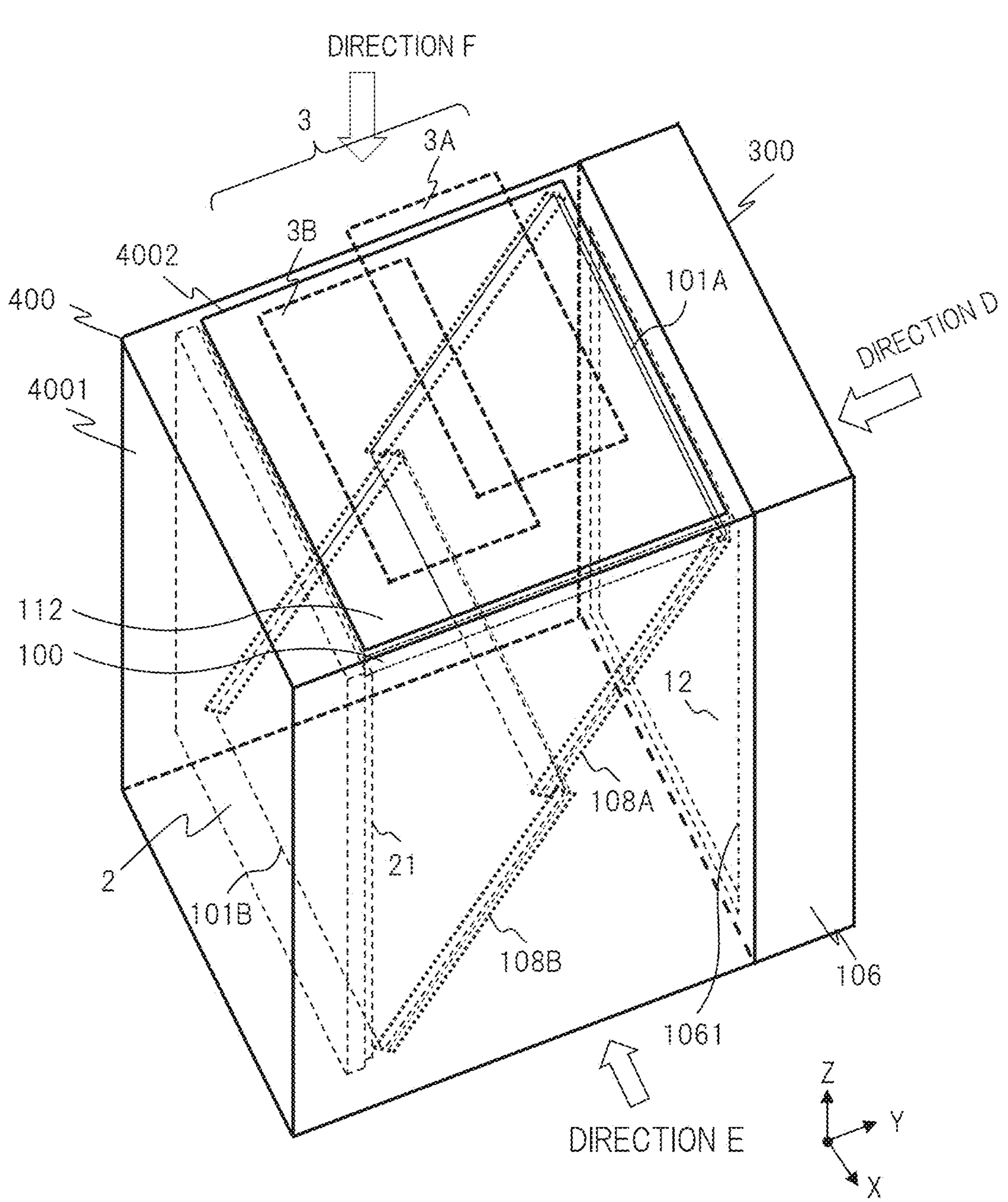
FIG. 7 is a diagram showing an external configuration example of an air floating video display apparatus according to the embodiment (first embodiment)

FIG. 7 shows a perspective view as an external configuration example of an air floating video display apparatus suitable for installation on a desk according to one embodiment (referred to as a first embodiment). FIG. 7 shows a perspective view of external appearance of the air floating video display apparatus when viewed obliquely from above. Here, an apparatus front surface is set to a surface corresponding to a direction in which the user can visually recognize the air floating video 3 (3A, 3B) formed by the air floating video display portion 400 from the front surface. A direction F is a direction in which the user visually recognizes the air floating video 3 (3A, 3B) from the front surface, and corresponds to a negative direction in the Z direction.

For the purpose of explanation, a coordinate system and directions like (X, Y, Z) shown in the drawings may be used. The Z direction is a vertical direction and an up-down direction, the X direction and the Y direction are two horizontal directions that are perpendicular to each other, the X direction is a depth direction and a front-back direction (front-back horizontal direction in the screen of the air floating video 3), and the Y direction is a right-left direction (right-left horizontal direction in the screen of the air floating video 3).

The Z-type configuration in FIG. 7 has the same position relationship in components (video display apparatus 1, beam splitter 101, retroreflector 2, and the like) as the Z-type configuration in FIG. 3. For a function of forming the air floating video 3, the respective components of the air floating video display apparatus (video display apparatus 1, beam splitter 101, retroreflector 2, and the like) have a predetermined positional relationship and are fixed to one another. That is, the video display apparatus 1, the beam splitter 101 (101A, 101B), the retroreflector 2, and the like of the video display apparatus portion 300 in FIGS. 7 and 8 have a predetermined potential relationship and are arranged and fixed so as to form a Z-shape similarly to the configuration in FIG. 3.

The air floating video display apparatus of the first embodiment shown in FIG. 7 roughly includes a video display apparatus portion 300, a casing 106 corresponding to the video display apparatus portion 300, an air floating video display 400, and a casing 4001 having an opening hole (opening) 4002 and corresponding to the air floating display 400.

The video display apparatus portion 300 is mounted and accommodated in the casing 106, in other words, in an accommodation portion of the video display apparatus 1. In FIG. 7, when an illustrated X-Y plane is set to a desk surface (in this example, a horizontal plane), the casing 106 is arranged along an X-Z plane perpendicular to the desk surface. The casing 106 is generally rectangular and has a flat plate shape with a predetermined height (predetermined thickness in the Y direction). Inside the casing 106, the video display apparatus 1 (FIG. 8) is arranged on the desk surface along the X-Z plane. The air floating video display portion 400 is arranged opposite to the casing 106 in the Y direction.

The air floating video display portion 400 is mounted and accommodated in the housing 4001. The air floating video display portion 400 is configured by the retroreflector 2, the λ/4 plate 21, two beam splitters 101A and 101B, frames 108A and 108B supporting the beam splitters 101A and 101B, and the like. The frames 108A and 108B may also be referred to as beam splitter supporters. This embodiment includes the transparent member 100 such as a glass plate and the absorption type polarization plate 112 for the purpose of reducing the influence of the external light incident from a direction F on the retroreflector 2 and the video display apparatus 1. The direction F is the Z direction, which is the vertical direction in this example, the direction from top to bottom and is perpendicular to the opening hole 4002.

In this embodiment, in the casing 4001, the beam splitters 101A and 101B having a step are arranged obliquely with respect to the desk surface. The "obliquely" corresponds to an angle formed between the Y direction of the desk surface (X-Y plane) and a direction of one side of each main surface of the beam splitters 101A, 101B (sides supported by the frames 108A and 108B) and, for example in FIG. 8, an oblique angle α thereof is about 45 degrees.

The beam splitters 101A and 101B having the step include the beam splitter A as a first beam splitter 101A located on an upper side in the Z direction and the oblique direction, and the beam splitter 101B as a second beam splitter located on a lower side in the Z direction and the oblique direction. Here, the "step" is that, for example, the beam splitter 101A and the beam splitter 101B are arranged at different vertical position or horizontal position so that they are not arranged on the same plane.

The retroreflector 2 and the λ/4 plate 21 are arranged on an opposite side in the Y direction (on the left side in FIG. 7) with respect to the video display apparatus 1 (FIG. 8) so as to sandwich the beam splitters 101A and 101B. The λ/4 plate 21 is arranged on a side of arranging the beam splitters 101A and 101B (on the right side in FIG. 7) with respect to the main surface of the retroreflector 2. That is, the λ/4 plate 21 is arranged on the light incidence side of the retroreflector 2.

The air floating videos 3A and 3B (indicated by broken line frames) are projected upward in the Z direction from the beam splitters 101A and 101B between the casing 106 and the retroreflector 2, and are arranged in the horizontal direction (X-Y plane). The air floating video 3A is an aerial image formed correspondingly to the beam splitter 101A, and the air floating video 3B is an aerial image formed correspondingly to the beam splitter 101B. In this embodiment, the air floating video 3A and the air floating video 3B are arranged at different heights in the Z-axis direction, that is, the vertical direction (FIG. 8), and are arranged with such a step that the air floating video 3A is located at a position higher than the air floating video 3B.

In this embodiment, the casing 106 of the video display apparatus portion 300 of the air floating video display apparatus is arranged on the right side in the Y direction with respect to the casing 4001 (retroreflector 2 and the like therein) of the air floating video display portion 400, but is not limited to this. Depending on the situation, the position relationship between the casing 106 and the retroreflector 2 may be reversed, or may be arranged not only horizontally but also vertically. That is, the beam splitters 101A and 101B are arranged between the light emission side of the video display apparatus 1 of the casing 106 and the retroreflector 2. A light emission side of the casing 106 and a light incidence/emission side of the retroreflector 2 are arranged so as to oppose each other via the beam splitters 101A and 101B, and the beam splitters 101A and 101B are arranged obliquely to a light incidence/emission plane.

The frames 108A and 108B are members that support the beam splitters 101A and 101B. The frame 108A supports the beam splitter 101A, and the frame 108B supports the beam splitter 101B. The frames 108A and 108B are grooves for fixing the beam splitters 101A and 101B or support members made of metal or a resin, which are arranged on an inner wall side of the casing 4001. In FIG. 7, the frames 108A and 108B have portions (frame portions) provided as shown by dotted lines with respect to an inner wall of a side surface portion on a front side (positive side) of the casing 4001 in the X direction. Those portions support sides on a front side (side surfaces) of the beam splitters 101A and 101B in the X direction. Similarly, the frames 108A and 108B have portions (frame portions) provided on an inner wall of a side surface portion on a back side (negative side) in the X direction of the casing 4001. Those portions support the sides (side surfaces) of the beam splitters 101A and 101B on the back side (side surface) in the X direction.

The frames 108A and 108B hold predetermined inclinations of the beam splitters 101A and 101B, vertical and horizontal distances between the beam splitters 101A and 101B, and the like.

In this embodiment, the components of the video display apparatus 1 as shown in FIG. 6, that is, the light source apparatus 13, the liquid crystal display panel 11, the absorption type polarization plate 12 not illustrated in FIG. 6, and the like are accommodated in and fixed to the casing 106. An opening 1061 is provided on a left-side surface of the casing 106 in the Y direction and on a right-side surface of the casing 4001 in the Y direction. The opening 1061 is a portion through which the video light from the video display apparatus 1 passes or is transmitted. A transparent member or the like may be provided in the opening 1061. The video light corresponding to the video displayed on the video display apparatus 1, more specifically, the liquid crystal display panel 11, passes through this opening 1061 and proceeds toward the beam splitters 101A and 101B located on the left side (negative direction) in the Y direction.

Similar to the above-described configuration (FIG. 3), the beam splitters 101A and 101B have the properties of transmitting P-polarized light and reflecting S-polarized light, and can be formed by, for example, depositing an optical thin film on a flat glass substrate. At this time, the incident angle of the polarized light to the beam splitter 101 (101A, 101B) is generally about 45 degrees±15 degrees.

Figure 8:
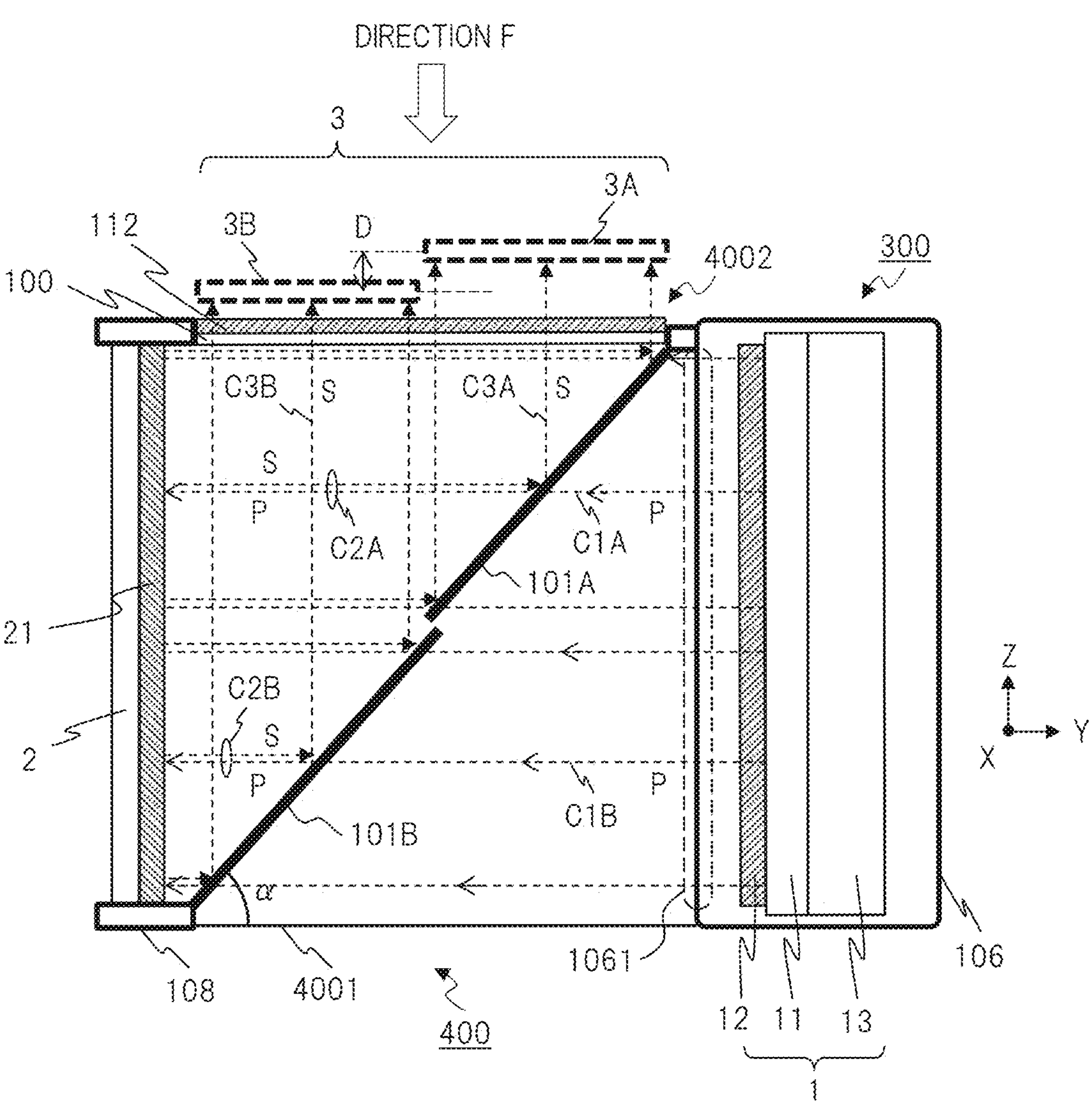
FIG. 8 is a diagram showing a cross-sectional configuration example of the air floating video display apparatus according to the embodiment (first embodiment) when viewed from a side.

FIG. 8 shows an internal structure by a cross-sectional view when the side surfaces of the video display apparatus portion 300 and the air floating video display 400 in FIG. 7 are viewed from the X direction (direction E in FIG. 7). The video display apparatus portion 300 and the air floating video display 400 have the same structure as the Z-type structure in FIG. 3, as shown. If the configuration in FIG. 3 is rotated in the drawing so that the direction C in FIG. 3 becomes the vertical direction (Z direction), the configuration in FIG. 3 and the configuration in FIG. 8 are the same except for some configurations. A difference between the configuration in FIG. 3 and the configuration in FIG. 8 is in that the beam splitter 101 (101A, 101B) is divided into two parts and is arranged in two layers so as to have the step.

In FIG. 8, the video display apparatus portion 300, that is, the casing 106 and the video display apparatus 1 accommodated in the casing 106 are arranged in a direction in which the video light from the liquid crystal display panel 11 is emitted in the negative direction (left) and in the Y direction. That is, the video display surface of the liquid crystal display panel 11 is arranged on the X-Z plane which is a vertical plane. Further, in the casing 106, the light source apparatus 13, the liquid crystal display panel 11, and the absorption type polarizer 12 are arranged in order from right (positive) to left (negative) in the Y direction. In FIG. 8, the video light emitted from the video display apparatus 1 via the opening 1061 and onto optical axes C1A and C1B in the negative direction of the Y direction is indicated by broken line arrows. The optical axis C1A is an optical axis corresponding to the beam splitter 101A, and the optical axis C1B is an optical axis corresponding to the beam splitter 101B. Among the three broken line arrows for each of the beam splitters 101A and 101B, a center line indicates the optical axis, and lines on both left and right sides indicate a range of the luminous flux.

The video light emitted from the liquid crystal display panel 11 is light having predetermined polarization characteristics, for example, P-polarized light (parallel polarized light: P stands for Parallel). This video light with the P-polarized light passes through the beam splitters 101A and 101B, as they are, on the optical axes C1A and C1B in the negative direction (left) of the Y direction, and proceeds toward the retroreflector 2 on the optical axes C2A and C2B corresponding to the optical axes C1A and C1B. The beam splitters 101A and 101B have properties of passing the P-polarized light and reflecting the S-polarized light (vertically polarized light; S stands for Senkrecht). The beam splitters 101A and 101B are arranged to form an angle of, for example, about 45 degrees with this video light with the P-polarized light (optical axes C1A and C1B, Y direction). In other words, the beam splitters 101A and 101B are arranged so that their main surfaces form an angle of about 45 degrees with respect to the Z direction, which forms the main surfaces of the liquid crystal display panel 11 and the retroreflector 2.

In addition, the beam splitters 101A and 101B are arranged so that their height positions in the Z direction and their horizontal positions in the Y direction are different when viewed from an extension line of each main surface (in other words, extension surface), thereby being configured so as have a plurality of layers. In the embodiment shown in FIG. 8, the beam splitter 101A is arranged at a higher position than a position of a main surface extension line of the beam splitter 101B, in other words, the beam splitter 101A is arranged at a horizontal position shifted from the main surface extension line of the beam splitter 101B in the negative direction of the Y direction.

The frame 108 in FIG. 8 is a frame coupled to the frame 108B (FIG. 7) that supports the beam splitter 101B, extends in the X direction, also supports the retroreflector 2, and is fixed to the casing 4001.

Figure 14:
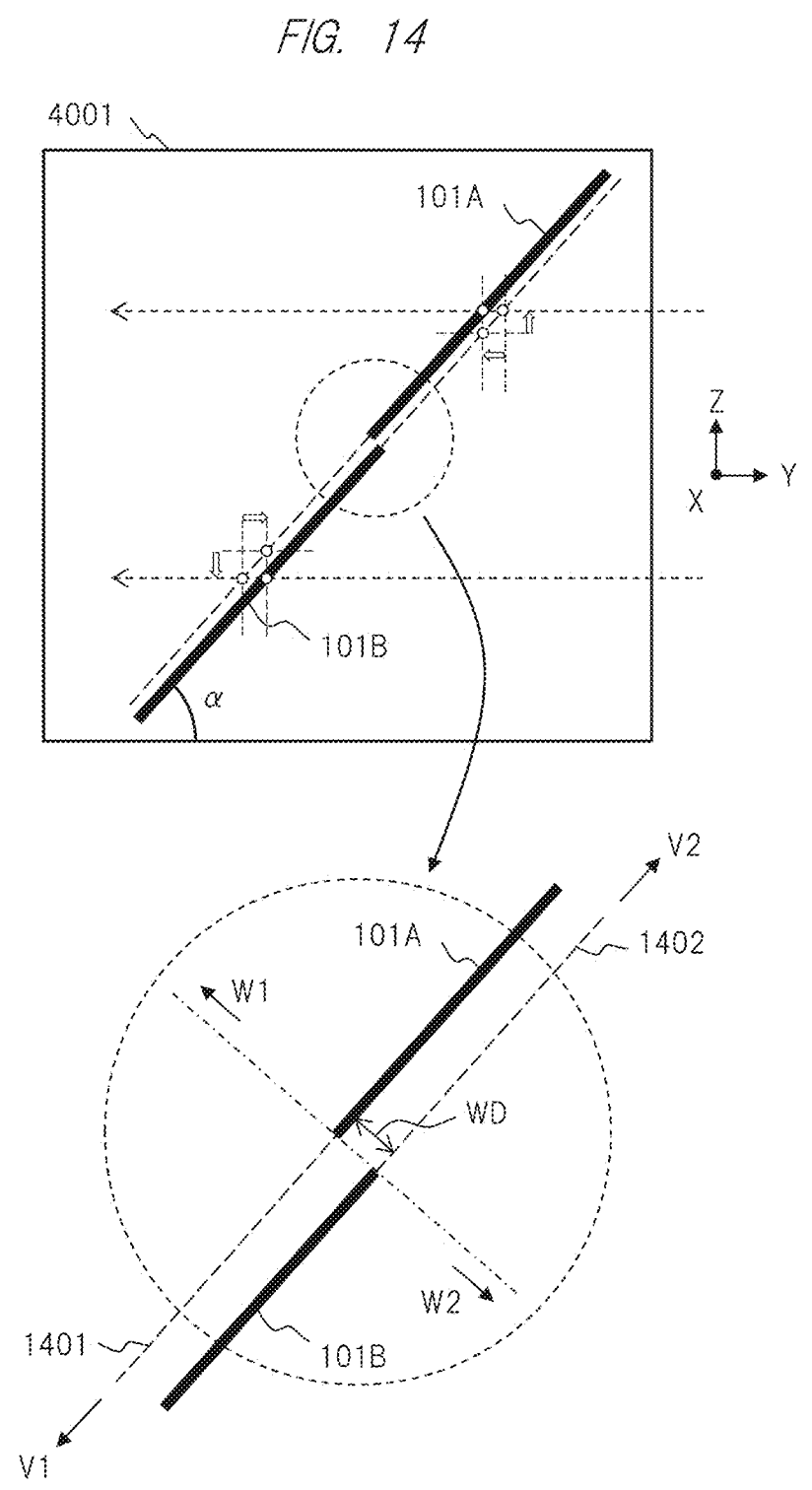

FIG. 14 is a supplementary explanatory diagram of the beam splitters 101A and 101B having the above-mentioned steps. In FIG. 14, for the sake of explanation, a portion that forms the step with respect to the casing 4001 is shown in an enlarged scale as parts of the obliquely arranged beam splitters 101A and 101B in FIG. 8. In an enlarged portion, the lower side of the beam splitter 101A and the upper side of the beam splitter 101B are arranged close to each other at a predetermined interval. As one end portion of the beam splitter 101A, shown is an extension line 1401 extending from the lower side, which is the end portion near the beam splitter 101B, in an obliquely downward direction V1 along the main surface. Similarly, as one end portion of the beam splitter 101B, shown is an extension line 1402 extending from the upper side, which is the end portion near the beam splitter 101A, in an obliquely upward direction V2 along the main surface. A surface including the extension line 1401 of the beam splitter 101A (extension surface) is a first layer, and a surface including the extension line 1402 of the beam splitter 101B is a second layer. The directions V1 and V2 are directions of the main surfaces (light incidence/emission surfaces) of the beam splitters 101A and 101B and are directions having a predetermined angle α with respect to the Y direction. The main surface of the beam splitter 101A is arranged on a plane formed by the direction V1 and the X direction (first layer), and the main surface of the beam splitter 101B is arranged on a plane formed by the direction V2 and the X direction (second layer).

The one end portion (lower side) of the beam splitter 101A and on the end portion (upper side) of the beam splitter 101B are arranged close to each other in the directions V1, V2, and the like. In this example, when the two layers are viewed in a plan view, that is, when viewed in directions W1 and W2, the one end portion of the beam splitter 101A and the one end portion of the beam splitter 101B are arranged so as to have exactly contact with each other. However, they are not limited to this.

Further, as shown by the dashed lines, directions perpendicular to the directions V1 and V2 are defined as the directions W1 and W2. The beam splitter 101A and beam splitter 101B are arranged with a distance WD in the directions W1 and W2. In other words, the beam splitter 101B is arranged at a position shifted by the distance WD in the direction W2 from a position on the extension line 1401 of the beam splitter 101A, and the beam splitter 101A is arranged on the extension line 1402 of the beam splitter 101B from a position shifted by the distance WD in the direction W1 from a position on the extension line 1402 of the beam splitter 101B. This arrangement is also considered as an arrangement at the position shifted from the position in the Y direction or the Z direction. For example, the beam splitter 101B may be considered to be arranged at a height position downward shifted by a predetermined distance in the Z direction from the position on the extension line 1401 of the beam splitter 101A. In other words, the beam splitter 101B may be considered to be arranged at a horizontal position rightward shifted by a predetermined distance in the Y direction from the position on the extension line 1401 of the beam splitter 101A.

In this way, the beam splitters 101A and 101B are arranged as two beam splitters by dividing the base beam splitter 101 in FIG. 3 into two. In addition thereto, the beam splitters 101A and 101B are configured so as to have a plurality of layers (particularly, two layers) arranged at different positions in the Y direction which is the horizontal direction and in the Z direction which is the height direction. In other words, the beam splitters 101A and 101B are configured so as to have the plurality of layers (particularly, two layers) arranged at different positions with the distance WD in the oblique directions W1 and W2 in FIG. 14 which are the directions perpendicular to the main surface. Such a step between the beam splitters 101A and 101B is reflected to a step of the air floating video 3 (3A, 3B).

Returning to FIG. 8, meanwhile, the λ/4 plate 21 is provided on the light incidence surface of the retroreflector 2. The video light with the P-polarized light on the optical axes C2A and C2B, which is emitted from the video display apparatus 1 and transmits the beam splitters 101A and 101B, passes through the λ/4 plate 21 twice in total, before being reflected by the retroreflector 2 and after being reflected, thereby performing the polarization conversion from the P-polarized light to the S-polarized light. As a result, the video light with the S-polarized light, which travels on the optical axes C2A and C2B after being reflected by the retroreflector 2, is reflected by the beam splitters 101A and 101B, and travels on the optical axes C3A and C3B in the Z direction. As shown in the figure, after passing through an outside of the opening 4002, the transparent member 100, and the absorption type polarizer 112, this video light with the S-polarized light generates and displays the air floating videos 3A and 3B, which are real images, at a predetermined position in the Z direction.

The predetermined positions where the air floating video 3A and the air floating video 3B are formed are determined according to an optical distance of an optical path in an optical system including the video display apparatus 1, the beam splitters 101A and 101B, and the polarization separator 2. In this embodiment, the positions of forming the air floating videos 3A and 3B are positions upward in the Z direction and on the upper side above a region of the main surface of the retroreflector 2, in other words, are positions upward above at least the opening hole 4002. Further, as described above, the beam splitters 3A and 3B are configured so as to have the plurality of layers (two layers) arranged at the different positions, so that as shown in the figure, the air floating videos 3A and 3B are also formed on the plurality of layers (two layers) different in height position in the Z direction, and formed as the air floating video 3 having the step.

In this embodiment, the beam splitter 101B is placed at the lower height position than the beam splitter 101A, so that the air floating video 3B corresponding to the beam splitter 101B is formed at the lower height position than the air floating video 3A corresponding to the beam splitter 101A. In FIG. 8, the air floating videos 3A and 3B are arranged with the distance D in the Z direction. The air floating video 3A is arranged on the positive side (right) in the Y direction, and the air floating video 3B is arranged on the negative side (left) in the Y direction. The predetermined position of this air floating video 3 (3A, 3B) can be adjusted according to design. By changing a size of the step (distance WD in FIG. 14) between the beam splitters 101A and 101B, a size of the step (distance D) of the air floating video 3 (3A, 3B) also changes.

As described above, in this embodiment, the air floating videos 3A and 3B are generated by the video light with the linearly polarized (S-polarized in this embodiment) light. The user who is an observer observing the air floating video 3 (3A, 3B) can suitably visually recognize the air floating video 3 (3A, 3B) from the upper side in the Z direction, that is, from a direction F indicated by an arrow. When viewed from the user, the air floating video 3A appears to be closer to the user than the air floating video 3B.

In the above embodiment, the air floating video display apparatus configured by the video display apparatus 1, the beam splitters 101A, 101B, the retroreflector 2, and the like can keep a Z-type position relationship as shown in FIG. 8 and provide the air floating videos 3A and 3B with excellent visibility to the user (observer). Also, based on the image/video displayed on the screen of the same liquid crystal display panel 11, the air floating video 3 (3A, 3B) having a height difference and a step is obtained by an image region of the beam splitter 101A through which the optical axis C1A passes and an image region of the beam splitter 101B through which the optical axis C1B passes. By this embodiment, it is possible to provide a three-dimensional aerial floating video 3 that has a sense of depth as if a conventional planar aerial image had been spatially arranged. The air floating video display apparatus of the above embodiment can be suitably used in a state of being arranged on a horizontal surface such as a desk, a table, or a shelf.

Note that, as shown in FIG. 8, when the beam splitters 101A and 101B are arranged at an angle of about 45 degrees with respect to the video light with the P-polarized light (optical axes C1A and C1B, Z direction), the video display apparatus 1, that is, the videos displayed on the video display apparatus 1, that is, the liquid crystal display panel 11 are generated and displayed as air floating videos 3A and 3B while maintaining an aspect ratio of the videos. More specifically, when a perfect circle is displayed on the screen of the liquid crystal display panel 11, the same perfect circle is displayed also as the air floating videos 3A and 3B.

Figure 15:
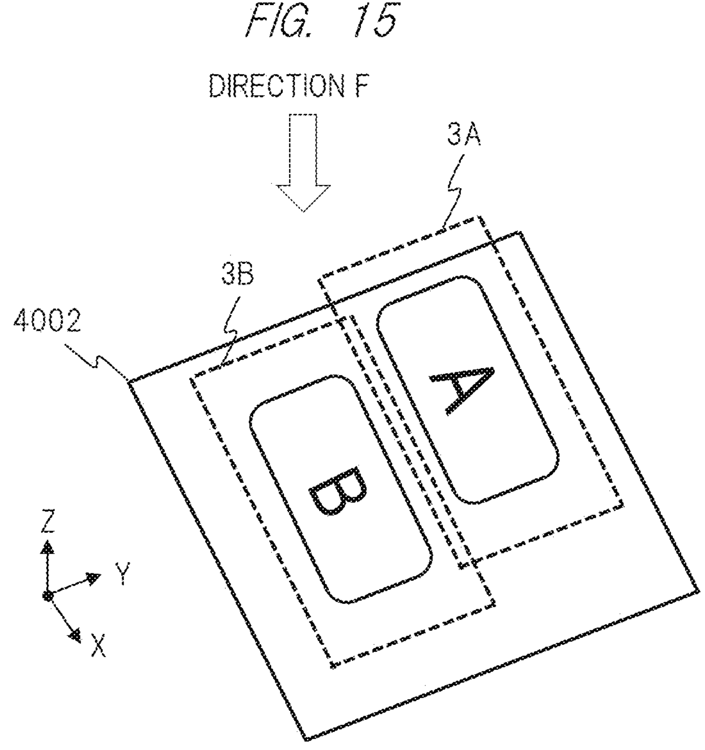
FIG. 15 is a diagram showing a display example of an air floating video in the air floating video display apparatus according to the embodiment (first embodiment)

FIG. 15 shows the first embodiment, and an example in which the three-dimensional air floating video 3 (3A, 3B) is displayed and viewed by the user. From the user's viewpoint, the air floating video 3 (3A, 3B) is visually recognized in the direction F in FIG. 7. For example, when viewed from the user, the videos are displayed so that the air floating video 3A is arranged on the upper side (positive side in the Y direction) and the air floating video 3B is arranged on the lower side (negative side in the Y direction). For example, a button A is displayed on the upper air floating video 3A, and a button B is displayed on the lower air floating video 3B. When viewed from the user's viewpoint, the button A appears to be floating on a front side of the button B. In this example, the areas of the air floating videos 3A and 3B are approximately the same, but are not limited to this. Note that although the aerial floating videos 3A and 3B are shown so as to overlap in FIG. 15, they do not need to overlap.

Second Embodiment

In the air floating video display apparatus of the first embodiment, as described in FIG. 6, the direction B of the light emission from the video display apparatus 1 configured so as to include the light source apparatus 13 and the liquid crystal display panel 11 is a position approximately perpendicular to a display surface of the liquid crystal display panel 11, and the light source apparatus 13 has an emission light flux having a narrow divergence angle like a laser beam. This makes it possible to obtain the effects of the first embodiment described above.

Figure 9:
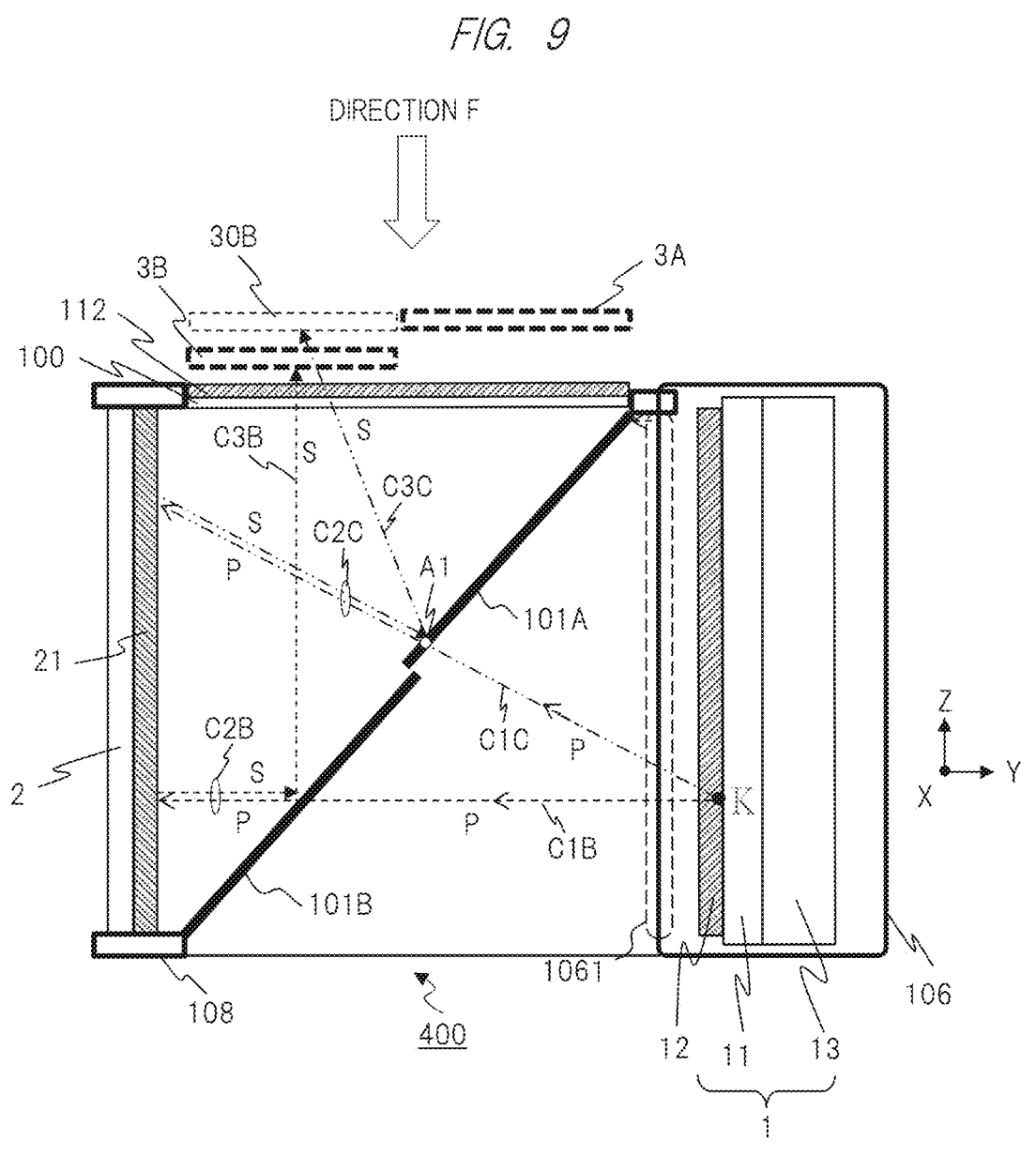

In contrast, FIG. 9 shows, as a comparative example, one example in which a divergence angle of the emission light flux from the video display apparatus 1 is a wide angle, and shows an example of generation of an unnecessary aerial image(s). FIG. 9 shows a configuration example of cross-section of the air floating video display 400 viewed from a side.

In FIG. 9, video light with the P-polarized light, which is emitted from, for example, point K on the liquid crystal display panel 11 in the optical axis C1B in the negative direction (left) of the Y direction, passes through the beam splitter 101B, as it is, in the negative direction (left) of the Y direction. The video light proceeds toward the retroreflector 2 on the optical axis C2B corresponding to the optical axis C1B, is reflected by the retroreflector 2, and passes through the λ/4 plate 21 twice in total, thereby performing the polarization conversion from the P-polarized light to the S-polarized light. As a result, the video light with the S-polarized light that travels on the optical axis C2B after being reflected by the retroreflector 2 is reflected by the beam splitter 101B and travels on the optical axis C3B of the Z direction. This video light with the S-polarized light generates and displays the air floating video 3B, which is a real image, at a predetermined position in the Z direction as shown in the figure.

However, if the divergence angle of the emission light flux from the video display apparatus 1 is a wide angle, there is a possibility that some video light, which passes through not the beam splitter 101B but the beam splitter 101A, will also be present. In the example of FIG. 9, the video light, which is emitted obliquely upward to the left from point K on the liquid crystal display panel 11 and onto an optical path C1C of the P-polarized light, passes through a point A1 near one end portion of the beam splitter 101A, and proceeds toward the retroreflector 2 on an optical path C2C corresponding to the optical path C1C. The video light is reflected by the retroreflector 2 and passes through the λ/4 plate 21 twice in total, thereby performing the polarization conversion from the P-polarized light to the S-polarized light. As a result, the video light with the S-polarized light, which travels on the optical path C2C after the reflection by the retroreflector 2 so as to return back toward the point A1, is reflected near the point A1 of the beam splitter 101A and travels on an optical path C3C after the reflection. This video light with the S-polarized light generates and displays an air floating video 30B, which is a real image, at the same horizontal position as that of the air floating video 3A as shown in the figure and at a position higher than that of the Z direction, for example, at the same height position as that of the air floating video 3A.

As in this example, the video light emitted to the beam splitter 101B based on the video light with a wide divergence angle leaks into the beam splitter 101A, so that the air floating video 3A, which is an image similar to the air floating video 3B, is displayed at the same horizontal position as that of the air floating video 3B, for example, at the same height as that of the air floating video 3A. This air floating video 30B is an unnecessary aerial image, and is visually recognized like a reduction in the sense of depth and the ghost image from the user's (observer's) viewpoint. Here, an example in which the video light emitted to the beam splitter 101B leaks to the beam splitter 101A has been described, but conversely, it is also considered that the video light emitted to the beam splitter 101A leaks to the beam splitter 101B. Consequently, a video similar to the air floating video 3A is displayed as an unnecessary aerial image at the same horizontal position as that of the air floating video 3A, for example, at the same height as that of the air floating video 3B. In this case as well, from the user's (observer's) view point, the unnecessary aerial image is visually recognized like the reduce in the sense of depth and the ghost image.

As described above, instead of the beam splitter that the user desires to irradiate with the video light from a corresponding image region on the liquid crystal display panel 11 described in FIG. 9, the video light leaks in a direction of the beam splitter adjacent thereto, so that a problem arises in that the sense of depth of the generated air floating vide decreases and the ghost images occur. Below, a solution to this problem, that is, a method for preventing or reducing deterioration of the sense of depth of the air floating video and the occurrence of the ghost images will be described.

Figures 10A, 10B:
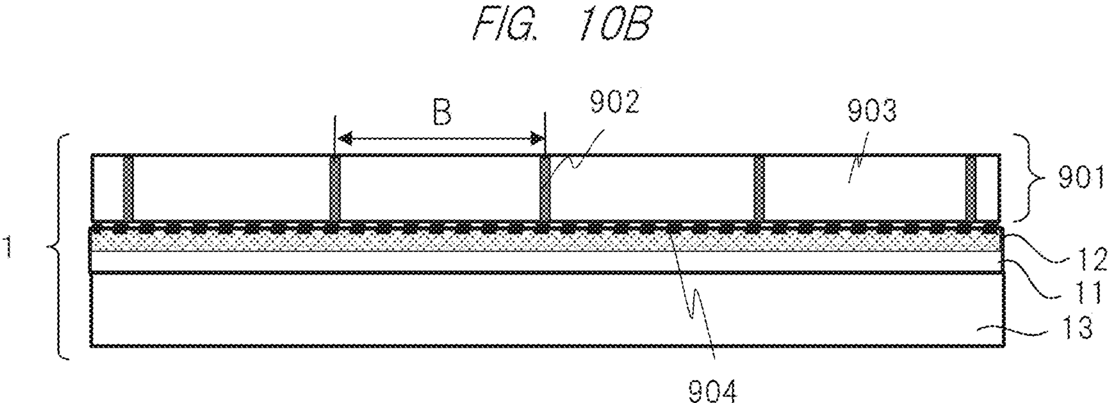
FIG. 10A is a diagram showing a cross-sectional configuration example of an air floating video display apparatus according to one embodiment (second embodiment) when viewed from a side.
FIG. 10B is a diagram showing a cross-sectional configuration example of an air floating video display apparatus according to one embodiment (second embodiment) when viewed from a side.

FIG. 10A shows a configuration example of a cross-section of an air floating video display apparatus according to one embodiment (referred to as second embodiment) about one example for solving the above-mentioned problem, the air floating video display apparatus adhering to and fixing a video light control sheet 901 on and to a video light emission surface (particularly, a surface of the absorption type polarizer 12) of the above-mentioned video display apparatus 1, the cross-section being viewed by a side. As shown as one example in FIG. 10B, the video light control sheet 901 is configured by arranging light transmission portions 903 and light absorption portions 902 alternately, and adheres to and is fixed to the video light emission surface of the liquid crystal display panel 11 (particularly, absorption type polarizer 12) by an adhesive layer 904. The video light emitted from the liquid crystal display panel 11 is transmitted in a direction of the light transmission portion 903, but the video light obliquely emitted is blocked by the light absorption portion 902.

In FIG. 10A, the video light emitted from, for example, the point K on the liquid crystal display panel 11 onto the optical path C1C obliquely upward left (FIG. 9) is blocked by the video light control sheet 901 at a point X 500*a*. Therefore, the video light emitted to the beam splitter 101B is prevented from leaking into the beam splitter 101A as shown in FIG. 9. Consequently, the air floating video 30B, which is a video similar to the air floating video 3B, at the same horizontal position as that of the air floating video 3B and at the same height as that of the air floating video 3A (FIG. 9) is no longer displayed. From the user's (observer's) viewpoint, the decrease in the sense of depth and the visual recognition of the ghost images can be prevented. Conversely, the video light emitted to the beam splitter 101A can also be prevented from leaking into the beam splitter 101B. For example, the video light proceeding toward the beam splitter 101B from a point K' in the video region on the upper side of the liquid crystal display panel 11 is blocked by the video light control sheet 901 at a point X'.

As this video light control sheet 901, for example, a viewing angle control film (VCF) manufactured by Shin-Etsu Polymer Co., Ltd. is suitable. A structure of the VCF is a sandwich structure in which transparent silicon and black silicon are arranged alternately and a synthetic resin is arranged on the light incidence/emission surface. Consequently, when this VCF is applied as the video light control sheet 901 of this embodiment, the above-mentioned effects can be expected.

Third Embodiment

Figure 11:
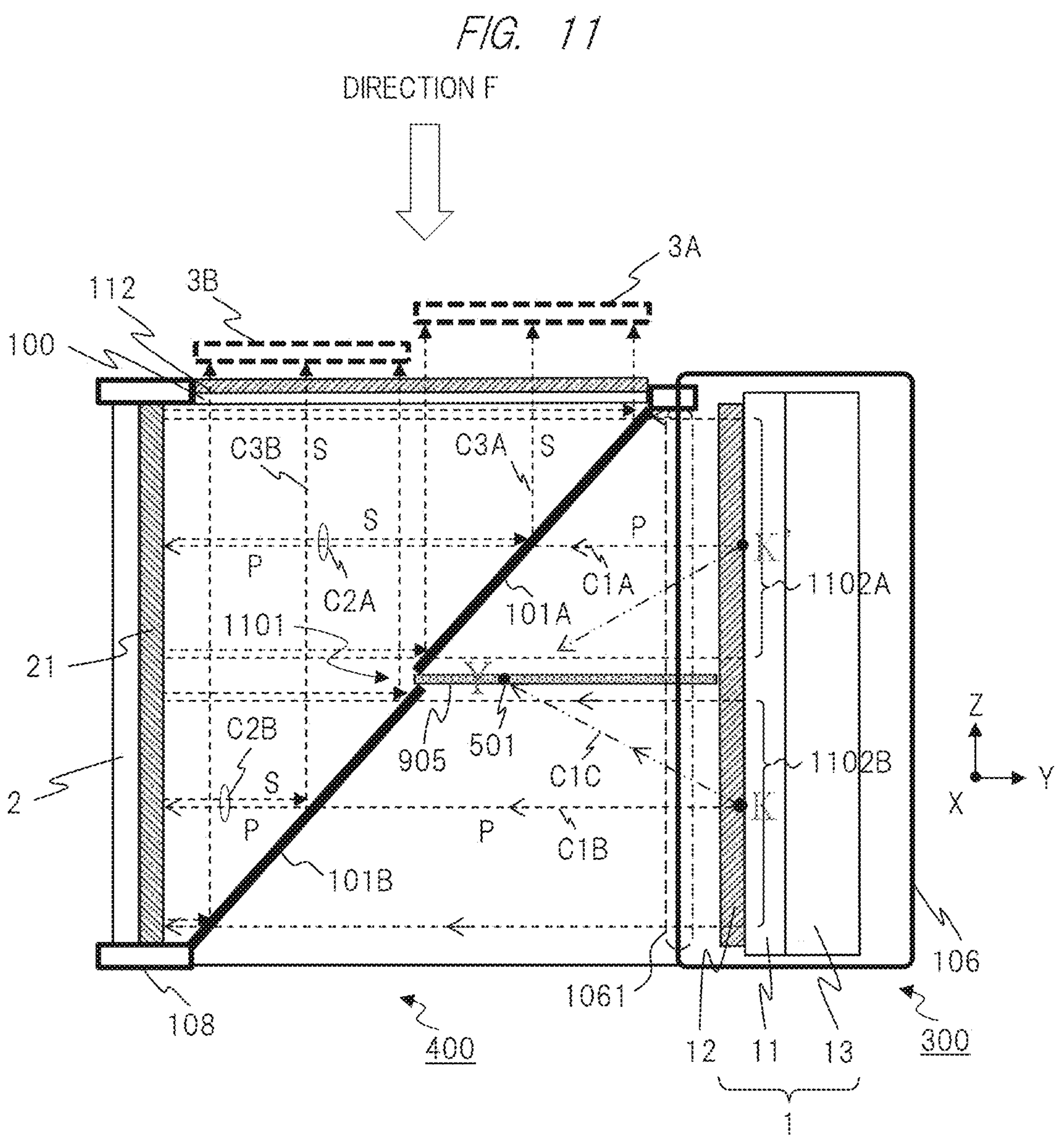
FIG. 11 is a diagram showing a cross-sectional configuration example of an air floating video display apparatus according to one embodiment (third embodiment) when viewed from a side.

FIG. 11 shows a configuration example of a cross-section of an air floating video display apparatus according to one embodiment (referred to as a third embodiment) about one example for solving the above-mentioned problem, the air floating video display apparatus being provided with shielding wall 905 in an air floating video display 400, the cross-section being viewed by a side. The shielding wall 905 is provided at a height position corresponding to a gap 1101 of the step between the beam splitter 101A and the beam splitter 101B in the Z direction and on the X-Y plane on the negative side in the Y direction on a video light emission axis of the video display apparatus 1. A width of the shielding wall 905 in the X direction is approximately equal to those of the beam splitter 101A and the beam splitter 101B. Further, a length of the shielding wall 905 in the Y direction is a length corresponding to a distance from a position of the gap 1101 of the beam splitters 101A and 101B to, for example, a position of contacting with or being close to the image display device 1 (especially, absorption type polarizer 12). The gap 1101 of the beam splitters 101A and 101B and the height position of the shielding wall 905 in the Z direction correspond to a position of dividing two video regions 1102A and 1102B directed to the beam splitters 101A and 101B on the screen (video display surface) of the liquid crystal display panel 11.

Like the beam splitters 101A and 101B, the shielding wall 905 is fixed by a frame (not shown), which is a support member made of grooves, metal, or resins and placed on an inner wall side of the side surface of the casing 4001 (FIG. 7). Consequently, the shielding wall 905 is held at the predetermined position described above.

The video light, which is emitted from, for example, the point K in the lower video region 1102B on the liquid crystal display panel 11 onto the obliquely upward left optical path C1C (FIG. 9) that advances toward the beam splitter 101A, is blocked by the shielding wall 905, for example, at a point Y 501. Therefore, the video light emitted to the beam splitter 101B is prevented from leaking into the beam splitter 101A. Consequently, an image similar to the air floating video 3B (the air floating video 30B) is no longer displayed at the same horizontal position as the air floating video 3B and at the same height as the air floating video 3A. From the user's (observer's) viewpoint, the decrease in the sense of depth and the visibility of the ghost images can be prevented. Conversely, the video light radiated to the beam splitter 101A can also be prevented from leaking into the beam splitter 101B similarly.

A form combining the video light control sheet 901 of the second embodiment and the shielding wall 905 of the third embodiment can also be adopted. When the direction of the user's (observer's) viewpoint in FIG. 11 is shifted from the direction F and is viewed from, for example, such an oblique viewpoint as to see through the liquid crystal display panel 11 via the opening 4002, the user may directly view the video on the liquid crystal display panel 11 via the beam splitters 101A and 101B. In such a case, in the liquid crystal display panel 11 provided with the video light control sheet 901 of the second embodiment, since the emission in an oblique direction is restricted, directly viewing the video on the liquid crystal display panel 11 via the beam splitters 101A and 101B can be prevented or reduced.

In the third embodiment shown in FIG. 11, the shielding wall 905 blocks the video light of the liquid crystal display panel 11 that is emitted to a position lower than the shielding wall 905, in other words, to the beam splitter 101B. Consequently, even if the direction of the user's (observer's) viewpoint deviates from the direction F, there is a low possibility that the user (observer) will directly see the video light of the liquid crystal display panel 11 emitted to the beam splitter 101B.

However, for the video light of the liquid crystal display panel 11 that is emitted to the beam splitter 101A, when the user (observer) views it from a direction of the oblique viewpoint which sees through the liquid crystal display panel 11, the video light on the liquid crystal may directly be viewed via the beam splitter 101A. In this case, the configuration of providing the video light control sheet 901 makes it possible to prevent or reduce the direct viewing of the video on the liquid crystal display panel 11 via the beam splitter 101A. In this case, a region of the video light control sheet 901 covering the liquid crystal display panel 11 may be limited to a position higher than that of the shielding wall 905 or to a region of the video corresponding to the beam splitter 101A, so that the direct viewing of the vide on the liquid crystal display panel 11 via the beam splitter 101A can be prevented or reduced.

Fourth Embodiment

Figure 12:
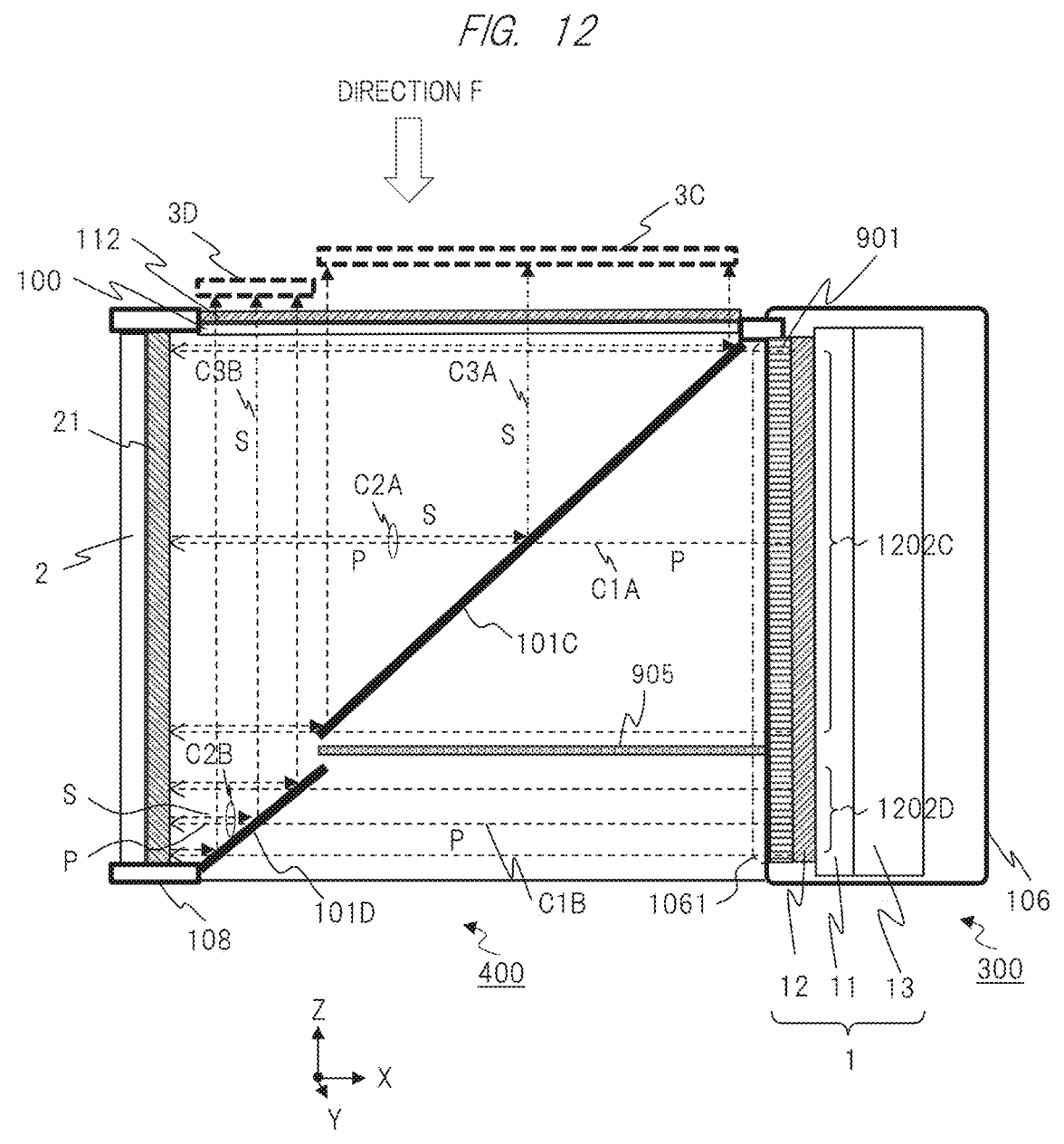

FIG. 12 shows a configuration example of a cross-section of an air floating video display apparatus according to one embodiment (referred to as a fourth embodiment), the air floating video display apparatus being provided with two beam splitters 101C and 101D different in a length on the X-Z plane that is a side surface or in an area of a main surface, the cross-section being viewed from a side. In FIG. 12, the length in the X-Z plane or the area of the main surface of the beam splitter 101C placed on an upper side in the Z direction is provided so as to become longer or larger than a length in the X-Z plane or an area of the main surface of the beam splitter 101D placed on a lower side.

In FIG. 12, a coordinate system has a left-right direction in the drawing as an X direction, and has a front-back direction in the drawing as the Y direction. The beam splitter 101C is arranged on the upper side in the Z direction, and the beam splitter 101D is arranged on the lower side in the Z direction. In the X direction, the beam splitter 101C is placed on a right side near a video display 300 including the video display apparatus 1, and the beam splitter 101D is placed on a far left side. The beam splitter 101C and the beam splitter 101D are arranged so as to have a step similar to the above embodiment. Correspondingly to a configuration of the lengths and the areas of the beam splitters 101C and 101D, the screen of the liquid crystal display panel 11 is divided into an upper video region 1202C and a lower video region 1202D. The upper video region 1202C is larger in area than the lower video region 1202D.

In this embodiment, an air floating video 3C is formed correspondingly to the beam splitter 101C, and an air floating video 3D is formed correspondingly to the beam splitter 101D. Note that in FIG. 12, video light emitted from the video display apparatus 1 via the opening 1061 and onto the optical axes C1A and C1B in the negative direction (left) of the X direction is indicated by broken line arrows. A center line of three broken line arrows of each of the beam splitters 101C and 101D indicates the optical axis, and the lines on both the left and right sides indicate a range of luminous fluxes. Further, in this embodiment, a video light control sheet 901 and a shielding wall 905 are provided as in the above-mentioned embodiment. In this embodiment, an air floating video 3C that is long in the X direction or has a large area, and an air floating video 3D that is short in the X direction or small in area with respect to the air floating video 3C are arranged with a difference in height or with a step. When viewed in the direction F from the user's viewpoint, the air floating video 3C is visually recognized as floating upward in front of the air floating video 3D.

This embodiment is suitable for services such as information image guidance and switch selection. For example, the air floating video display apparatus displays an information image on the air floating video 3C that is long in the X direction or large in area, and displays a switch (push button or the like) on the air floating video 3D that is short in the X direction or small in area. Consequently, since a difference in height or step is present between the information image and a switch image, visibility for the user (observer) is increased, which is suitable for improving operability. In the above embodiment, the positive side (right side) in the X direction is set to a large area floating video 3C, and the negative side (left side) in the X direction is set to a small area floating video 3D, but of course, they may conversely be arranged.

Figure 16:
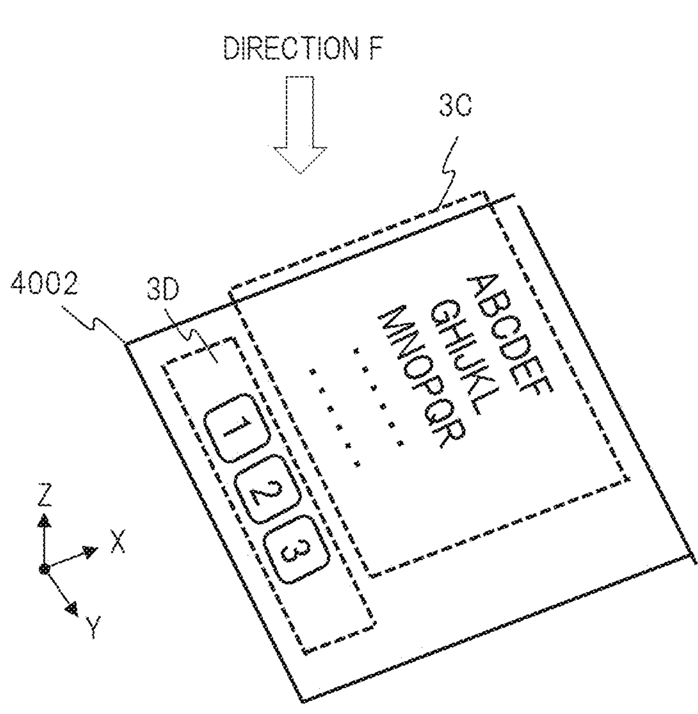
FIG. 16 is a diagram showing a display example of an air floating video in the air floating video display apparatus according to the embodiment (fourth embodiment)

FIG. 16 shows an example in which the three-dimensional air floating video 3 (3C, 3D) is displayed and visually recognized by the user in the above embodiment. From the user's viewpoint, the air floating video 3 (3C, 3D) is visually recognized in the direction F. For example, when viewed from the user, the videos are displayed so that the air floating video 3C is placed on the upper side (positive side in the X direction) and the air floating video 3D is placed on the lower side (negative side in the X direction). For example, an information image guide is displayed on the upper large-area air floating video 3C, and buttons (switches) 1, 2, and 3 are displayed on the lower small-area floating video 3D. The information image guide is guidance for a predetermined service, and is contents that, for example, provides guides such as selection of the button 1 in a first case and selection of the button 2 in a second case. From the user's viewpoint, the information image guide appears to be floating upward in front of the buttons. Further, although the aerial floating videos 3C and 3D are shown so as not to overlap in FIG. 16, they may overlap. Note that although not shown, the user's finger operation of the buttons on the air floating video 3D is detected by an aerial operation detection sensor. As a specific sensor configuration, a distance sensor using non-visible light such as infrared rays, non-visible light lasers, and ultrasonic waves, or a confiture that can detect coordinates on a two-dimensional plane by combining a plurality of these may be adopted. Further, the sensor may be configured as a ToF (Time of Flight) type LiDAR (Light Detection and Ranging).

Fifth Embodiment

Figure 13:
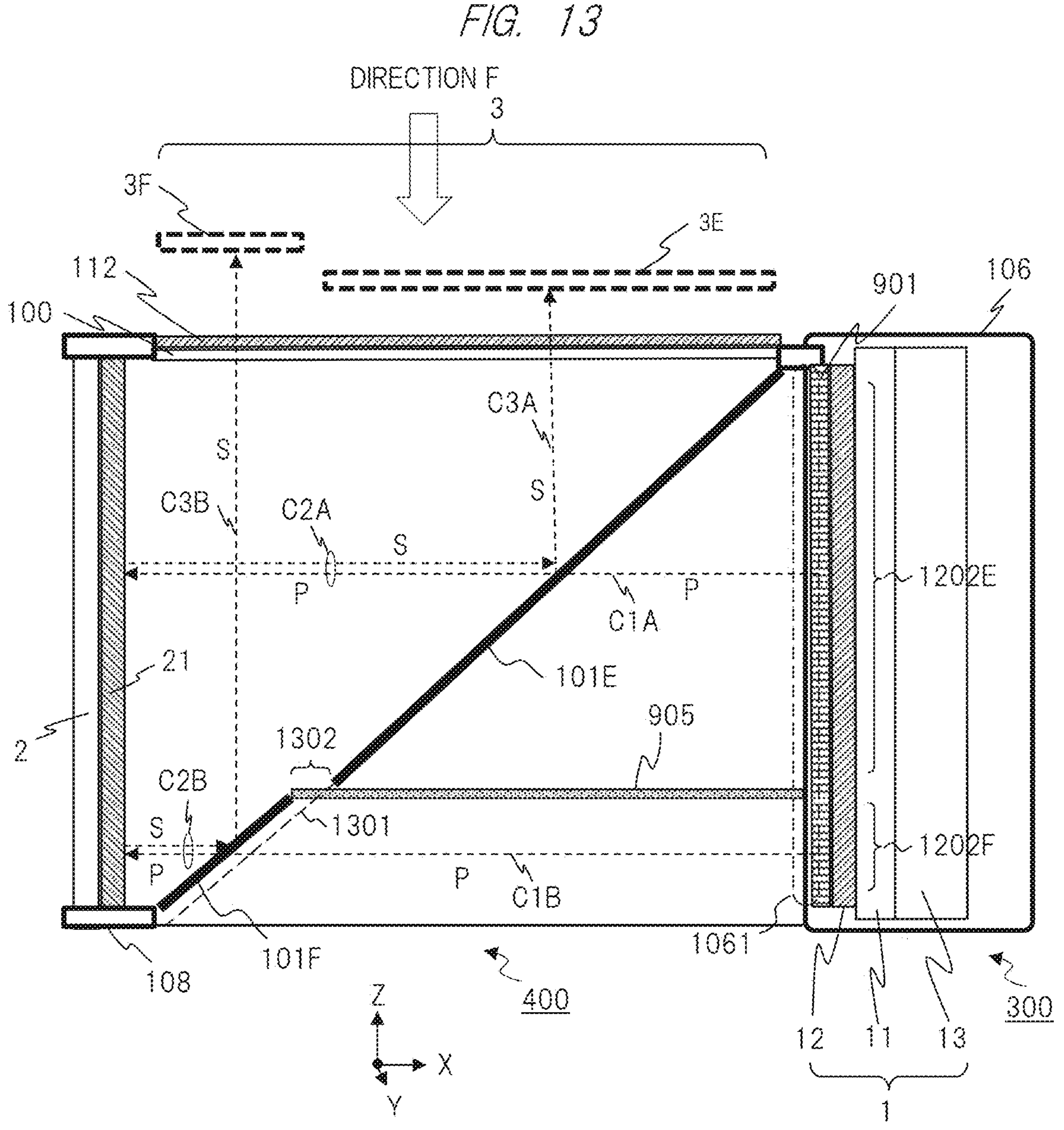
FIG. 13 is a diagram showing a cross-sectional configuration example of an air floating video display apparatus according to one embodiment (fifth embodiment) when viewed from a side.

FIG. 13 shows a configuration example of a cross-section of an air floating video display apparatus according to one embodiment (referred to as a fifth embodiment), the air floating video display apparatus being provided with two beam splitters 101E and 101F different in length in the X-Z plane or area of the main surface, and being different in arrangement relation of the beam splitters from the above-mentioned embodiment in FIG. 12. In FIG. 13, the length on the X-Z plane or the area of the main surface of the upper beam splitter 101E in the Z direction is provided so as to become longer or larger than the length on the X-Z plane or the area of the main surface of the lower beam splitter 101F in the Z direction. Furthermore, the beam splitter 101F is arranged at a position higher in the Z direction than a position on an extension line 1301 of the main surface of the beam splitter 101E, in other words, is arranged at a position shifted in the negative direction (left) of the X direction from the extension line 1301 of the main surface of the beam splitter 101E. In other words, in this embodiment, the lower beam splitter 101F is arranged at a position separate by a predetermined distance in the obliquely upward left direction that is a perpendicular direction with respect to an extension plane including the extension line 1301 of the upper beam splitter 101E. Consequently, the step is formed by the two beam splitters 101E and 101F.

The arrangement relationship between the two beam splitters 101E and 101F in FIG. 13 is opposite to the arrangement relationship between the two beam splitters 101C and 101D in FIG. 12. In each of the embodiments shown in FIGS. 7 to 12 described above, the second beam splitter placed on the lower side in the Z direction and on the lower portion is placed on the side lower than the extension line with respect to the first beam splitter placed on the upper side in the Z direction and on the upper portion, resulting in the configuration of the step. In contrast, in the embodiment of FIG. 13, the beam splitter 101F, which is the second beam splitter placed at the lower side in the Z direction and on the lower portion, is placed on the upper side above the extension line 1301 with respect to the beam splitter 101E, which the first beam splitter placed at the upper side in the Z direction and on the upper portion, resulting in the configuration of the step. Assuming that the beam splitter 101E is a first layer and the beam splitter 101F is a second layer, two layers are constituted by them.

In this embodiment, an air floating video 3E is formed correspondingly to the beam splitter 101E, and an air floating video 3F is formed correspondingly to the beam splitter 101F. Consequently, an air floating video 3 (3E, 3F) having a step is configured. The air floating video 3F formed correspondingly to the beam splitter 101F is arranged on the upper side in the Z direction above the air floating video 3E formed correspondingly to the beam splitter 101E. Note that in FIG. 13, the video light emitted from the video display apparatus 1 via the opening 1061 and onto the optical axes C1A and C1B in the negative direction (left) of the X direction is indicated by broken line arrows. A broken line arrow passing through the beam splitters 101E and 101F indicates the optical axis. Further, in this embodiment, the video light control sheet 901 and the shielding wall 905 are provided as in the above-mentioned embodiment.

Correspondingly to the configuration of the lengths and the areas of the beam splitters 101E and 101F, the screen of the liquid crystal display panel 11 is divided into an upper video region 1202E and a lower video region 1202F, and the upper vide region 1202E is larger in area than of the lower video region 1202F. The shielding wall 905 is arranged also at a portion of a gap 1302 in the X direction that configures the step between the beam splitters 101E and 101F.

In this embodiment, the air floating video 3E, which is long in the X direction or has a large area, and the air floating video 3F, which is short in the X direction or has a small area, are arranged so as to have a converse relationship with respect to the relationship of the height difference or the step shown in FIG. 12. This embodiment is also suitable for the services such as information image guide and switch selection. For example, a information image guide is displayed on the air floating video 3E which is long in the X direction or has the large area, and a switch video is displayed on the air floating video 3F which is short in the X direction or has a small area. Consequently, since the height difference or the step is present between the information image guide and the switch video, the visibility for the user (observer) is increased, resulting in being suitable for improving the operability.

As described above, according to the air floating video display apparatuses of the respective embodiments and the modification examples, they are mainly suitable for indoor use and the air floating videos with high visibility can be displayed. In addition, the air floating video display apparatus of this embodiment provides the height difference in the displayed space image, for example, the video display screen and input portions such as buttons are displayed at different heights, resulting having the configuration of improving the visibility and the operability. More specifically, the present embodiment has the configuration of arranging the above-mentioned beam splitters at the different heights to provide the height difference and displaying the stepped air floating video from each beam splitter. Furthermore, the air floating video display apparatus of this embodiment provides the height difference or the step in the air image displayed from the video light from one liquid crystal display panel, for example, displays the information display screen and the input portion such as the button at different heights, resulting in bringing about the effect of improving the visibility and the operability. When the generated air floating video is used as a non-contact user interface, such effects are brought about as to be more user-friendly for the user, have higher visibility and operability, and prevent and reduce erroneous operations and erroneous inputs.

[Occurrence of Unnecessary Light]

Figures 17A, 17B:
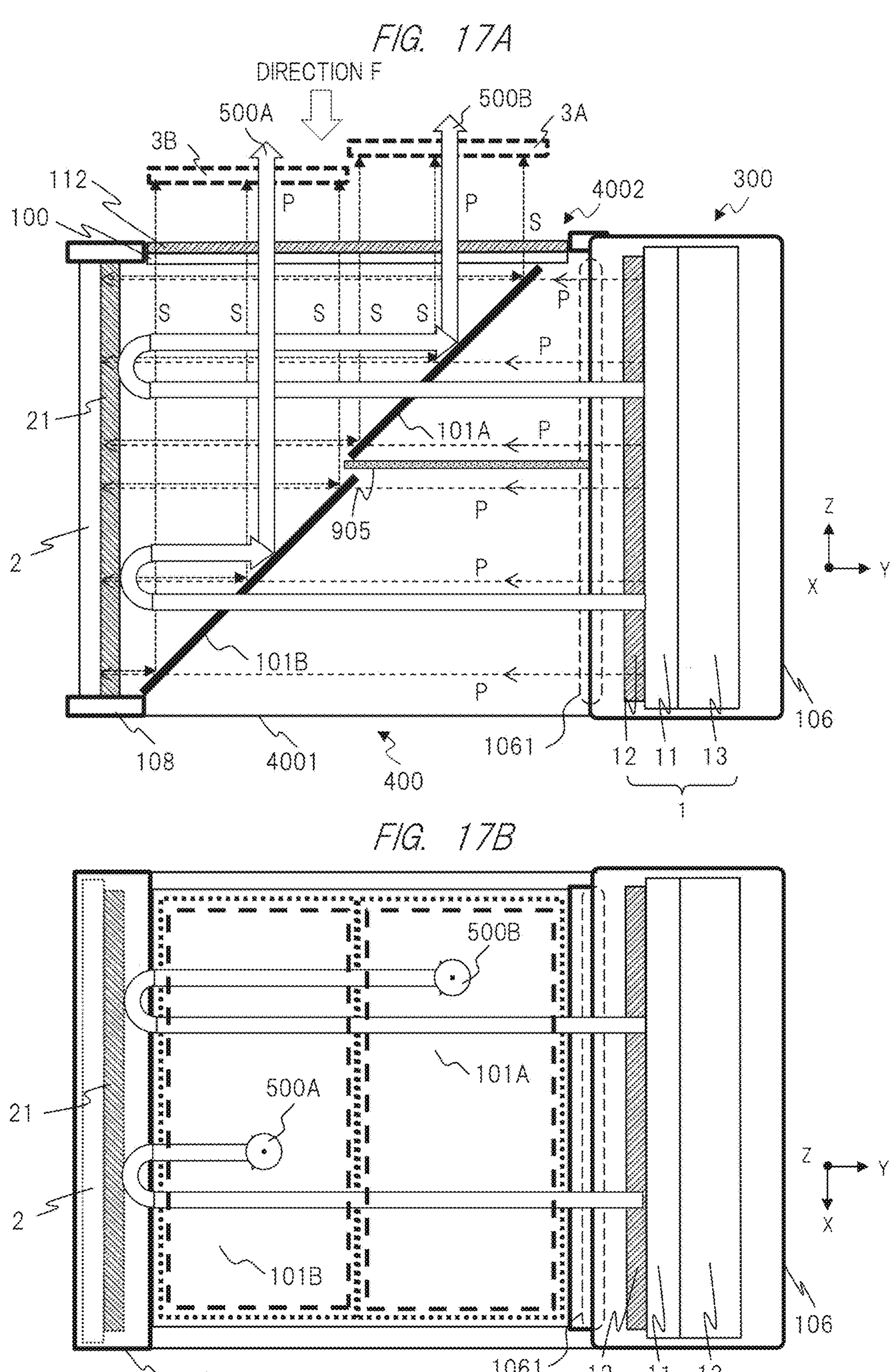
FIG. 17A is a diagram showing a generation example of unnecessary light in the air floating video display apparatus according to the embodiment (first embodiment)
FIG. 17B is a diagram showing a generation example of unnecessary light in the air floating video display apparatus according to the embodiment (first embodiment)

Regarding one example (first example) of FIG. 8, occurrence examples of unnecessary light are shown in FIGS. 17A and 17B. FIG. 17A is a cross-sectional view of an external appearance of the air floating video display apparatus viewed from a side, and FIG. 17B is a cross-sectional view of the external appearance of the air floating video display apparatus viewed from above. By the unnecessary light, a planar video displayed on the video display apparatus 1 is viewed from the direction F in which the user visually recognizes the air floating video 3 (3A, 3B) from the front. In FIGS. 17A and 17B, unnecessary light 500A and unnecessary light 500B are schematically illustrated by white arrows.

The video light with the P-polarized light, which is emitted from the video display apparatus 1, passes through the beam splitters 101A and 101B and reaches the λ/4 plate 21. By passing through the λ/4 plate 21, the video light is reflected by the retroreflector 2, passes through the λ/4 plate 21 twice in total, and is polarized and converted from the P polarized light to the S polarized light. However, the video light with the P-polarized light, which becomes the unnecessary lights 500A and 500B, travel to the beam splitters 101A and 101B with remaining in the P-polarized light by a portion of the video light with the P-polarized light which reaches the λ/4 plate 21 being specularly reflected on the surface of the λ/4 plate 21. Further, the portion of the vide light with the P-polarized light is specularly reflected also on the surfaces of the beam splitters 101A and 101B, and travels in the Z direction without passing through the beam splitters 101A and 101B.

As shown in the figure, this video light with the P-polarized light passes through an outside of an opening 4002, a transparent member 100, and an absorption type polarization plate 112, travels in the Z direction, and becomes unnecessary lights 500A and 500B visually recognized separately from the air floating videos 3A and 3B that are real images. Consequently, in a case of being vied from the direction F by the user, the planar video of the video display apparatus 1 due to the unnecessary lights 500A and 500B can be seen behind the air floating videos 3A and 3B, so that that poses a problem of interfering with the air floating videos.

Sixth Embodiment

Figure 18:
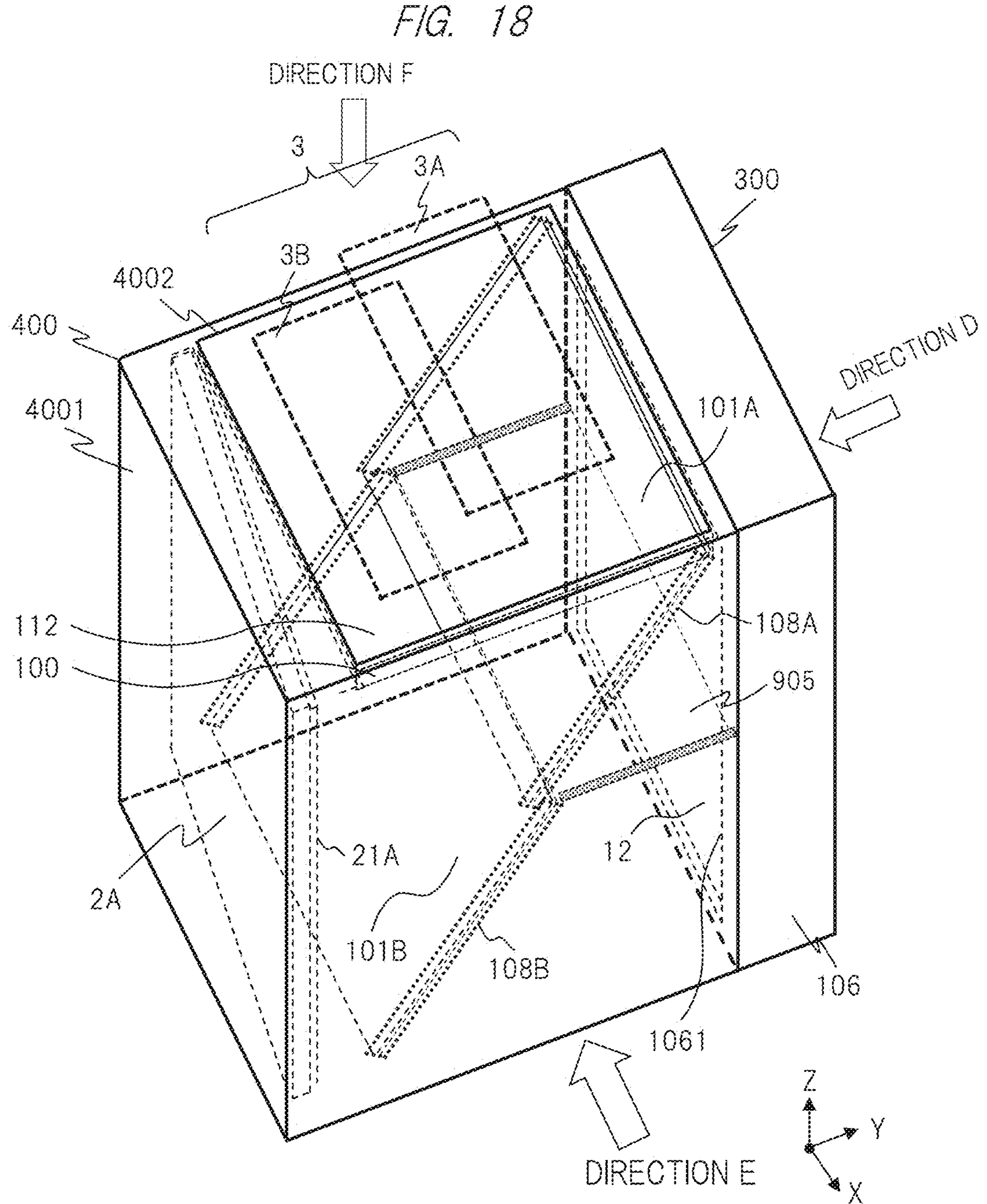
FIG. 18 is a diagram showing an external configuration example of an air floating video display apparatus according to an embodiment (sixth embodiment)

FIG. 18 is a perspective view of one embodiment (referred to as a sixth embodiment) seen obliquely from above. A retroreflector 2A and a λ/4 plate 21A are arranged not parallel to the X-Z plane but with an angle on the X-Y plane, and shows a configuration example of an air floating video display apparatus different from the embodiment of FIG. 8 in arrangement of the retroreflector 2 and the λ/4 plate 21. In this embodiment, for the retroreflector 2A and the λ/4 plate 21A, a side in the Z direction on a depth direction side (negative direction) in the X direction is arranged so as to be closer to the absorption polarization plate 12 placed in the casing 106 and the video display apparatus 1 of FIG. 6 (not shown) than to the absorption polarization plate 12 placed in the casing 106 and the video display apparatus 1 of FIG. 6 (not shown). Alternatively, for the retroreflector 2A and the λ/4 plate 21A, a side in the Z direction on a dept direction side (negative direction) in the X direction is arranged so as to protrude relatively in the positive direction of the Y direction with respect to the size in the Z direction on a front direction (positive direction) side in the X direction. Namely, the retroreflector 2A is arranged so as to face the display panel 11 (FIGS. 6 and 8) at a predetermined angle.

Figure 19A:
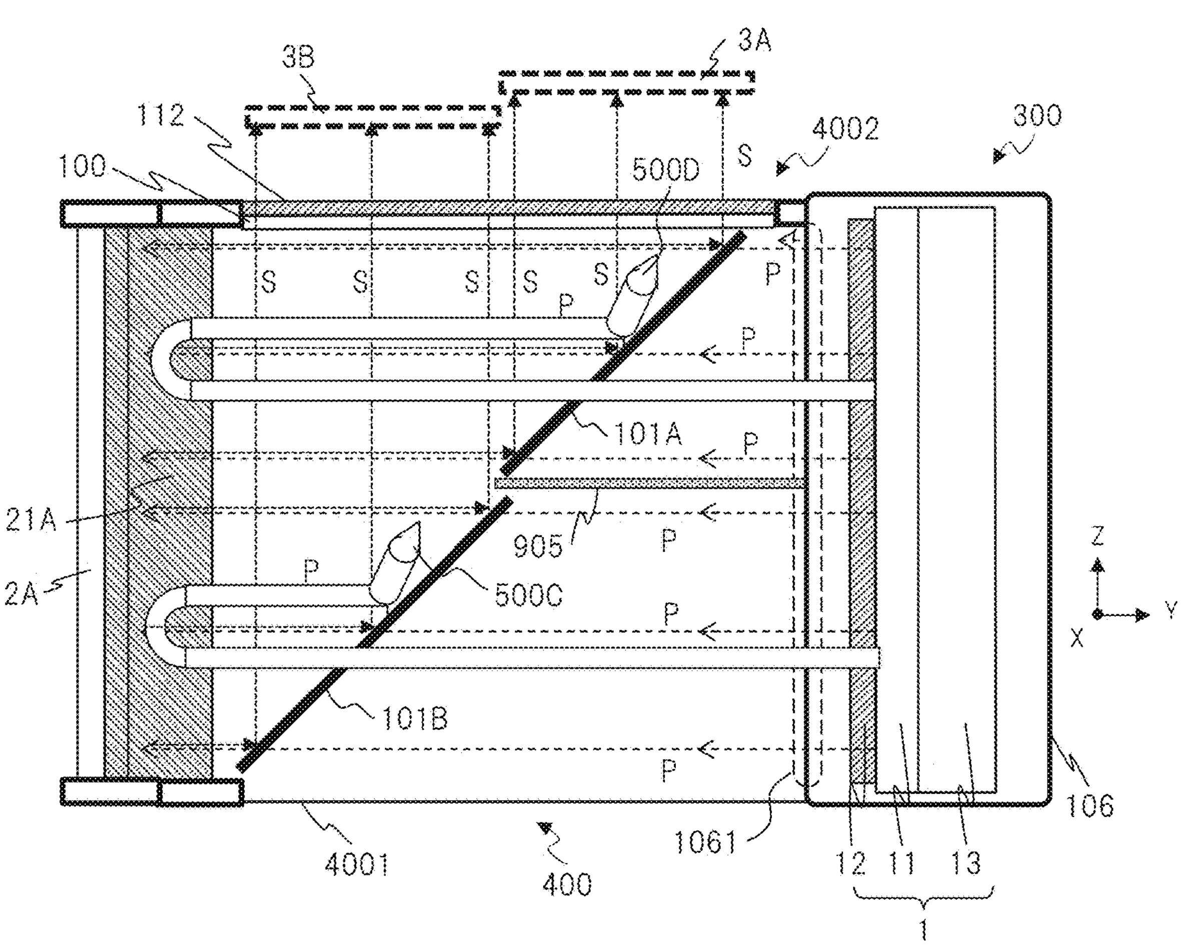
FIG. 19A is a diagram showing a cross-sectional configuration example of the air floating video display apparatus according to the embodiment (sixth embodiment) when viewed from the side and from above.
Figure 19B:
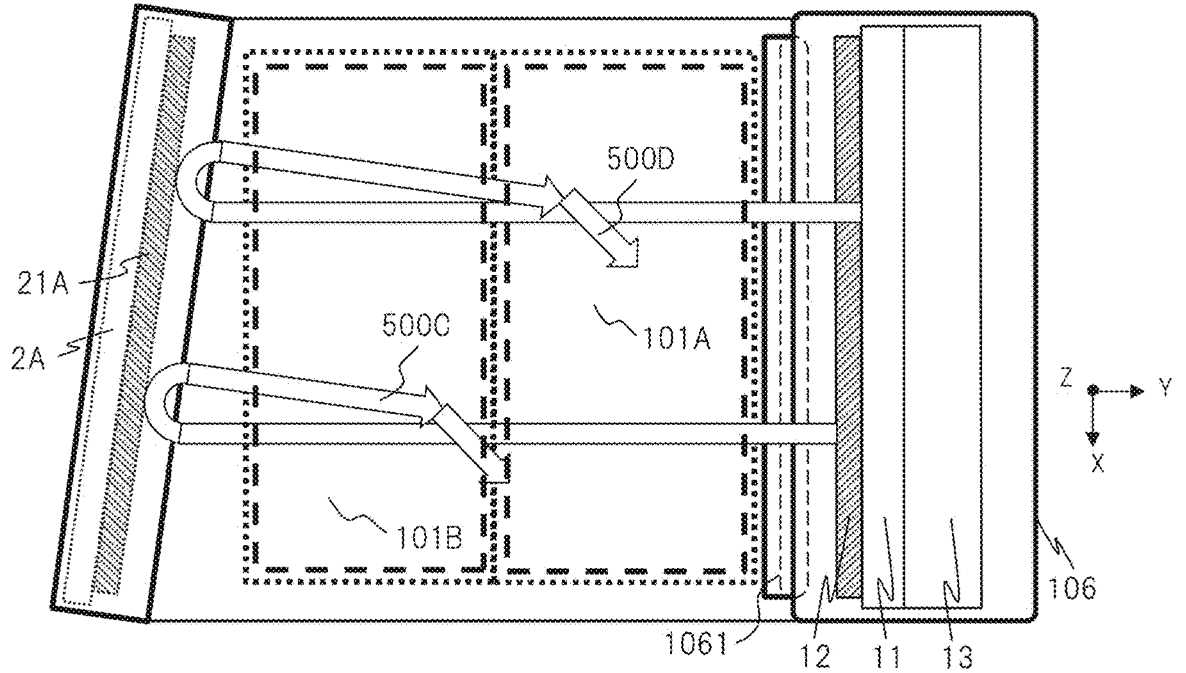
FIG. 19B is a diagram showing a cross-sectional configuration example of the air floating video display apparatus according to the embodiment (sixth embodiment) when viewed from the side and from above.

FIG. 19A is a cross-sectional view of the external appearance of the air floating video display apparatus according to one embodiment (sixth embodiment) of FIG. 18 when viewed from the side, and FIG. 19B is a cross-sectional view showing the air floating video display apparatus according to the embodiment (sixth embodiment) of FIG. FIG. 18 when viewed from above. In this embodiment, the beam splitters, that is, polarization separators are arranged plurally in number, and at least two polarization separators (101A, 101B) among the plurality of polarization separators are installed at different positions so that they are not arranged on the same plane. Further, respective corresponding sides of the retroreflector 2A and the display panel 11 are arranged so as to oppose each other, and a separation distance between the retroreflector 2A and the display panel 11 is different for at least one pair of parallel sides. In other words, the respective corresponding sides of the retroreflector 2A and the display panel 11 are arranged to oppose each other, and the separation distance between the side of the retroreflector 2A and the side of the display panel 11, which are perpendicular to the air floating videos 3A and 3B, is shorter on the one hand than on the other.

Similarly to FIGS. 17A and 17B, unnecessary lights 500C and 500D are schematically illustrated by white arrows. The video light with the P-polarized light, which is emitted from the video display apparatus 1, passes through the beam splitters 101A and 101B, and reaches the λ/4 plate 21A. By passing through the λ/4 plate 21A, the video light is reflected by the retroreflector 2A, passes through the λ/4 plate 21A twice in total, and is polarized and converted from the P-polarized light to the S-polarized light. By the video light with the P-polarized light, which becomes the unnecessary light 500C and 500D, a portion of the video light with the P-polarized light, which reaches the λ/4 plate 21A, is specularly reflected on the surface of the λ/4 plate 21A, and travels to the beam splitters 101A and 101B with remaining in the P-polarized light.

Further, a portion of the video light with the P-polarized light is also specularly reflected on the surfaces of the beam splitters 101A and 101B. In this embodiment, the retroreflector 2A and the λ/4 plate 21A are arranged not parallel to the X-Z plane but with an angle on the X-Y plane, so that the video light with the P-polarized light, which becomes the unnecessary lights 500 and 500D, is specularly reflected parallel to the incident light with respect to the Y-Z plane. However, the λ/4 plate 21A has an angle with respect to the X-Y plane, so that the video light is specularly reflected according to the incident angle and is incident on the surfaces of the beam splitters 101A and 101B with an angle on the X-Y plane. Therefore, the unnecessary lights 500C and 500D are specularly reflected on the surfaces of the beam splitters 101A and 101B according to the above-mentioned incident angles, but they deviate from the Z direction directly above and are travels in a direction outside the screen of the air floating videos 3A and 3B.

Consequently, when the user views the air floating videos 3A and 3B from the direction F, the unnecessary lights 500A and 500B are outside the screen of the air floating videos 3A and 3B and are not visually recognized, so that the interference with the visual recognition of the air floating videos due to the unnecessary lights 500A and 500B can be avoided.

Note that, contrary to the above, an arrangement angle between the retroreflector 2A and the λ/4 plate 21A on the X-Y plane can obtain the similar effect even if the side in the Z direction on the depth direction (negative direction) side in the X direction has such an arrangement relationship as to protrude relatively in the negative direction on the depth direction of the Y direction with respect to the side in the Z direction on the front direction (positive direction) side in the X direction.

Seventh Embodiment

Figures 20A, 20B:
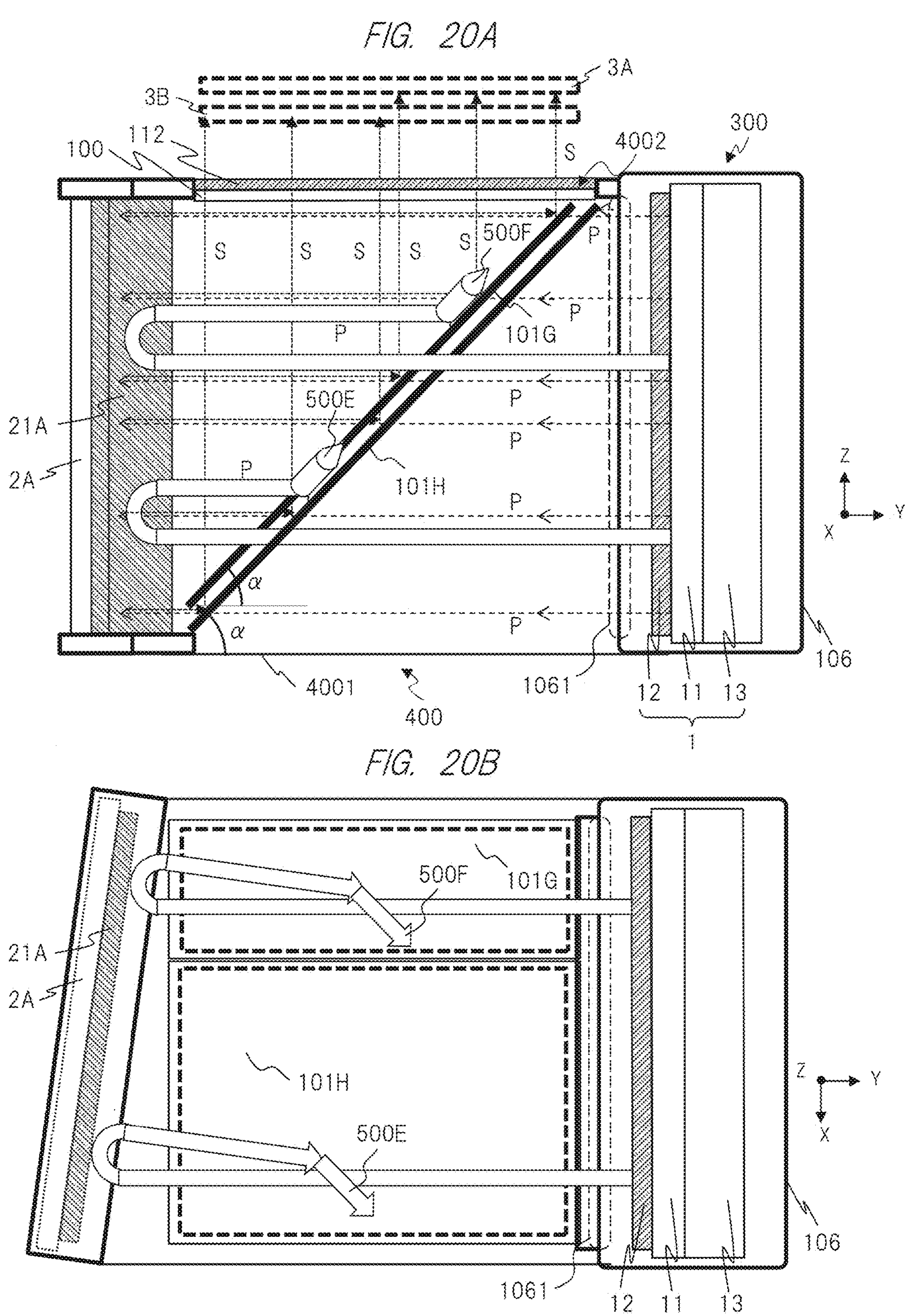
FIG. 20A is a diagram showing a cross-sectional configuration example of an air floating video display apparatus according to an embodiment (seventh embodiment) when viewed from a side and from above.
FIG. 20B is a diagram showing a cross-sectional configuration example of an air floating video display apparatus according to an embodiment (seventh embodiment) when viewed from a side and from above.

FIG. 20A is a cross-sectional view of an external appearance of an air floating video display apparatus according to one embodiment (seventh embodiment) when viewed from the side, and FIG. 20B is a cross-sectional view of the external appearance of the air floating video display apparatus according to the embodiment (seventh embodiment) when viewed from above. The embodiment of FIGS. 20A and 20B shows a configuration example of the air floating video display apparatus in which the arrangement of a beam splitter 101H and a beam splitter 101G are different from that of the embodiment of FIGS. 19A and 19B.

In FIGS. 20A and 28B, the beam splitter 101H and the beam splitter 101G are divided parallel to the Y-Z plane and have a step. The beam splitters 101H and 101G are arranged obliquely to a desk surface. The "oblique" corresponds to an angle that a direction of each one side of the main surfaces of the beam splitters 101G and 101H forms with respect to the Y direction of the desk surface (X-Y plane). For example, in FIGS. 20A and 20B, an angle α, which is its oblique angle, is about 45 degrees. The angle α here is an angle formed between a bottom surface of the casing 4001 and the beam splitter 101G, and is also an angle formed between the bottom surface of the casing 4001 and the beam splitter 101H. Further, FIGS. 20A and 20B shows an example in which angle α="angle formed between the bottom surface of the casing 4001 and the beam splitter 101G"="angle formed between the bottom surface of the casing 4001 and the beam splitter 101H"=45 degrees.

The embodiment shown in FIGS. 20A and 20B has the beam splitter 101G that is a first beam splitter located on the upper side in the Z direction and the oblique direction, and the beam splitter 101H that is a second beam splitter located on the lower side in the Z direction and the oblique direction. The beam splitter 101G and beam splitter 101H have a step in a Z-axis direction. Further, the retroreflector 2A is arranged so as to face the display panel 11 obliquely at a predetermined angle.

The air floating videos 3A and 3B (illustrated by broken line frames) rise upward in the Z direction from the beam splitters 101H and 101G between the casing 106 and the retroreflector 2A, and are arranged in the horizontal direction (X-Y plane). The air floating video 3A is an aerial image formed correspondingly to the beam splitter 101G, and the air floating video 3B is an aerial image formed correspondingly to the beam splitter 101H. In this embodiment, the air floating video 3A and the air floating video 3B are arranged at different heights in the Z-axis direction, that is, the vertical direction, and the air floating video 3A is arranged with the step that is located at a higher position than the air floating video 3B.

In this embodiment, in the retroreflector 2A and the λ/4 plate 21A, the side in the Z direction on the depth (negative direction) side in the X direction is closer to the video display apparatus 1 arranged in the casing 106 than to the side in the Z direction on the front direction (positive direction) side in the X direction. Alternatively, in the retroreflector 2A and the λ/4 plate 21A, the side in the Z direction on the depth direction (negative direction) side in the X direction is arranged so as to protrude relatively in the positive direction of the Y direction with respect to the side in the Z direction on the front direction (positive direction) side in the X direction. In this embodiment, at least two polarization separators (101H, 101G) among the plurality of beam splitters, that is, polarization separators are arranged so as to be separated in a direction of a line connecting the retroreflector 2A and the display panel 11. For example, the first polarization separator 101G is arranged in a first layer, and the second polarization separator 101H is arranged in a second polarization separator having a predetermined distance from the first layer.

The air floating video includes a first air floating video 3A formed by the video light passing through the first polarization separator 101G, and a second air floating video 3B formed by the video light passing through the second polarization separator 101H. The first air floating video 3A and the second air floating video 3B are formed at different positions so that they are not arranged on the same plane.

The video light with the P-polarized light, which is emitted from the video display apparatus 1, passes through the beam splitters 101A and 101B, and reaches the λ/4 plate 21A. By passing through the λ/4 plate 21A, the video light is reflected by the retroreflector 2A, passes through the λ/4 plate 21A twice in total, and is polarized and converted from the P-polarized light to the S-polarized light. The video light is reflected by the beam splitters 101H and 101G, and generates the air floating video 3A and the air floating video 3B in the Z-axis direction, that is, in the vertical direction. In this embodiment, the unnecessary lights 500E and 500F are schematically illustrated by white arrows.

The video light with the P-polarized light, which becomes the unnecessary lights 500E and 500F travels to beam splitters 101H and 101G with remaining in the P-polarized light by a portion of the video light with the P-polarized light, which reaches the λ/4 plate 21A, being specularly reflected on the surface of the λ/4 plate 21A. Further, the portion of the video light with the P-polarized light is also specularly reflected on the surfaces of the beam splitters 101H and 101G. In this embodiment, the retroreflector 2A and the λ/4 plate 21A are arranged not parallel to the X-Z plane but with an angle on the X-Y plane. Consequently, the video light with the P-polarized light, which becomes the unnecessary light 500E and 500F, is specularly reflected on the surface of the λ/4 plate 21A and parallel to the incident light with respect to the Y-Z plane, but the λ/4 plate 21A has an angle with respect to the X-Y plane. Therefore, the video light is specularly reflected at an angle corresponding to the incident angle, and is incident on the surfaces of the beam splitters 101H and 101G with the angle on the X-Y plane. Consequently, the unnecessary lights 500E and 500F are specularly reflected on the surfaces of the beam splitters 101G and 101H at angles corresponding to the above-mentioned incident angles, but they deviate from the Z direction directly upward and are reflected off the screen of the air floating videos 3A and 3B and travel in a direction outside the screens of the air floating videos 3A and 3B.

Consequently, when the user views the air floating videos 3A and 3B from the direction F, the unnecessary lights 500E and 500F are outside the screen of the air floating videos 3A and 3B and are not visually recognized, so that the interference of the visual recognition of the air floating videos due to the unnecessary lights 500E and 500F can be avoided.

Eighth Embodiment

Figure 21:
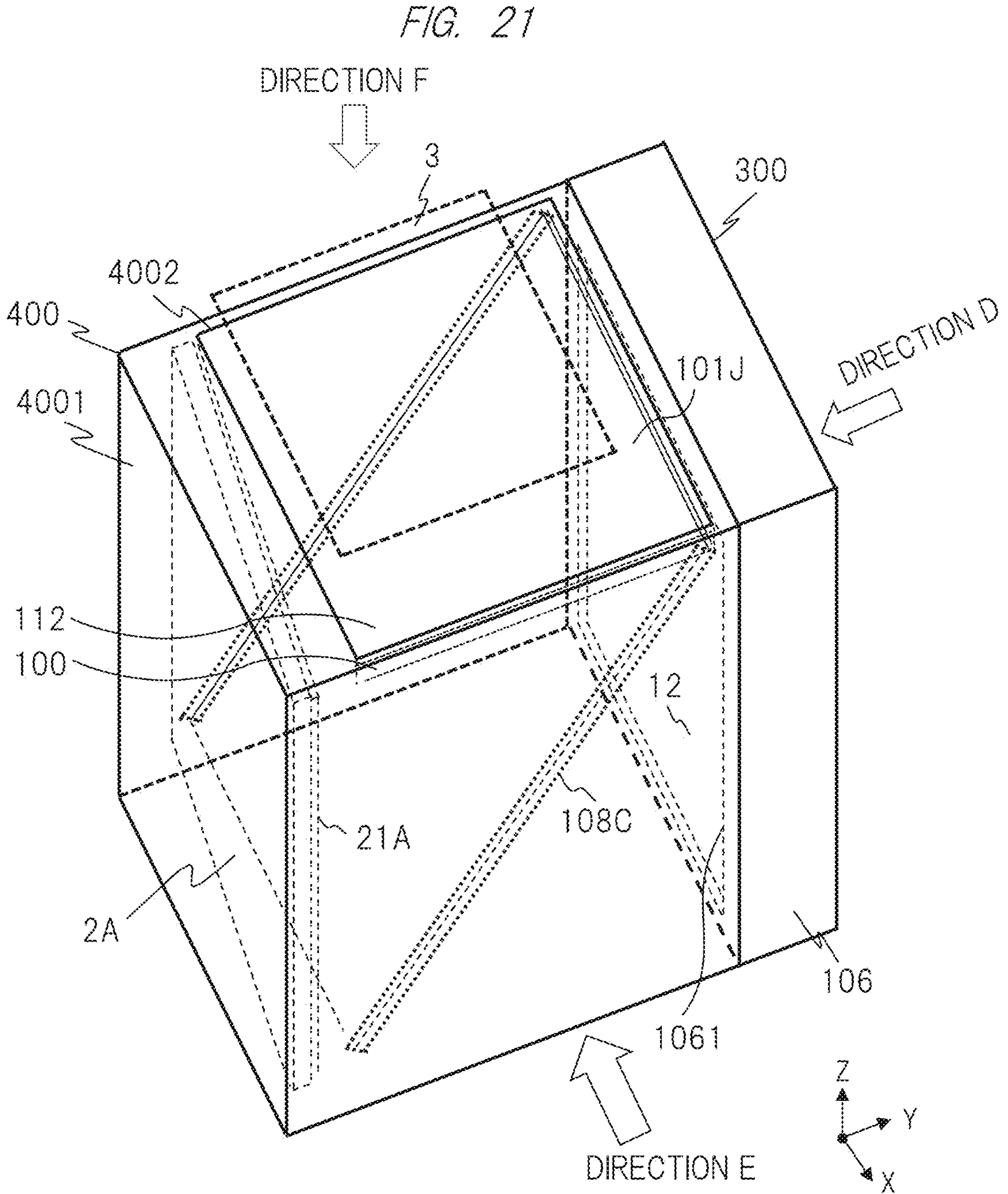
FIG. 21 is a diagram showing an external configuration example of an air floating video display apparatus according to an embodiment (eighth embodiment)

FIG. 21 shows a perspective view as a configuration example of an external appearance of a preferred air floating video display apparatus according to an embodiment (referred to as an eighth embodiment) when viewed obliquely from above. This embodiment can be used, for example, for installation on the desk. An embodiment shown in FIG. 21 shows a configuration example of an air floating video display apparatus different from the embodiments shown in FIGS. 18 and 19 in that a single beam splitter 101J that is not divided is arranged.

Figure 22A:
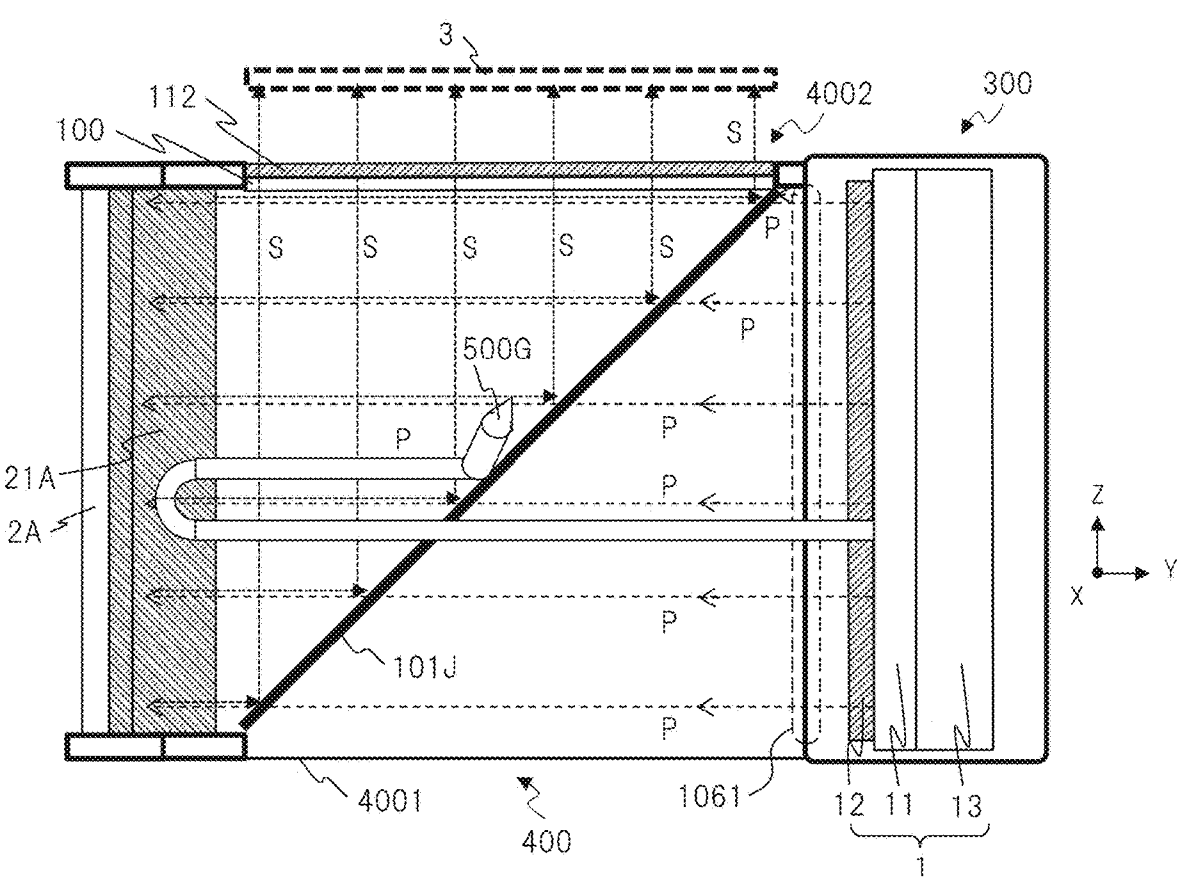
FIG. 22A is a diagram showing a cross-sectional configuration example of the air floating video display apparatus according to the embodiment (eighth embodiment) when viewed from the side and from above.
Figure 22B:
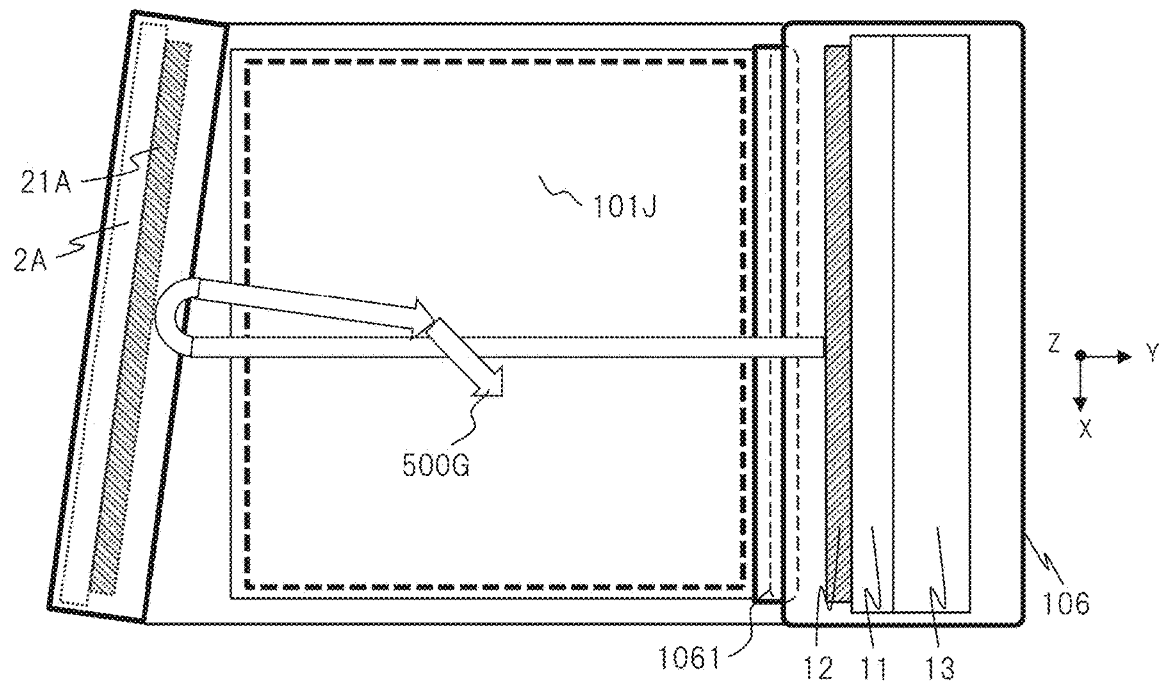
FIG. 22B is a diagram showing a cross-sectional configuration example of the air floating video display apparatus according to the embodiment (eighth embodiment) when viewed from the side and from above.

FIG. 22A shows a cross-sectional view of the external appearance of the floating video display apparatus according to one embodiment (eighth embodiment) of FIG. 21 when viewed from the side, and FIG. 22B shows a cross-sectional view of the external appearance of the floating video display apparatus according to one embodiment (eighth embodiment) of FIG. 21 when viewed from above. In FIG. 22B, the retroreflector 2A is arranged to face the display panel 11 obliquely at a predetermined angle.

The video light with the P-polarized light, which is emitted from the video display apparatus 1, passes through the beam splitter 101J and reaches the λ/4 plate 21A. By passing through the λ/4 plate 21A, the video light is reflected by the retroreflector 2A, passes through the λ/4 plate 21A twice in total, and is polarized and converted from the P-polarized light to the S-polarized light. The video light is reflected by the beam splitter 101J and generates the air floating video 3 in the Z-axis direction, that is, in the vertical direction. In this example, the unnecessary light 500G is schematically illustrated by white arrows.

A portion of the video light with the P-polarized light, which becomes the unnecessary light 500G, travels to the beam splitter 101J with remaining in the P-polarized light by a portion of the video light with the P-polarized light, which receives the λ/4 plate 21A, being specularly reflected on the surface of the λ/4 plate 21A. Further, the portion of the vide light with the P-polarized light is also specularly reflected on the surface of the beam splitter 101J. In this embodiment, the retroreflector 2A and the λ/4 plate 21A are arranged not parallel to the X-Z plane but with an angle on the X-Y plane. Consequently, the video light with the P-polarized light, which becomes the unnecessary light 500G, is specularly reflected on the surface of the λ/4 plate 21A parallel to the incident light with respect to the Y-Z plane. However, since the λ/4 plate 21A has an angle with respect to the X-Y plane, the vide light is specularly reflected at an angle corresponding to the incident angle and is incident on the surface of the beam splitter 101J with an angle on the X-Y plane. Therefore, the unnecessary light 500G is specularly reflected on the surface of the beam splitter 101J at an angle corresponding to the above-mentioned incident angle, but deviates from the Z direction directly upward and travels in a direction outside the screen of the air floating video 3.

Thus, when the user views the air floating video 3 from the direction F, the unnecessary light 500G is outside the screen of the air floating video 3 and is not visually recognized, so that the interference of the visual recognition of the unnecessary light 500G can be avoided.

Ninth Embodiment

Figures 23A, 23B:
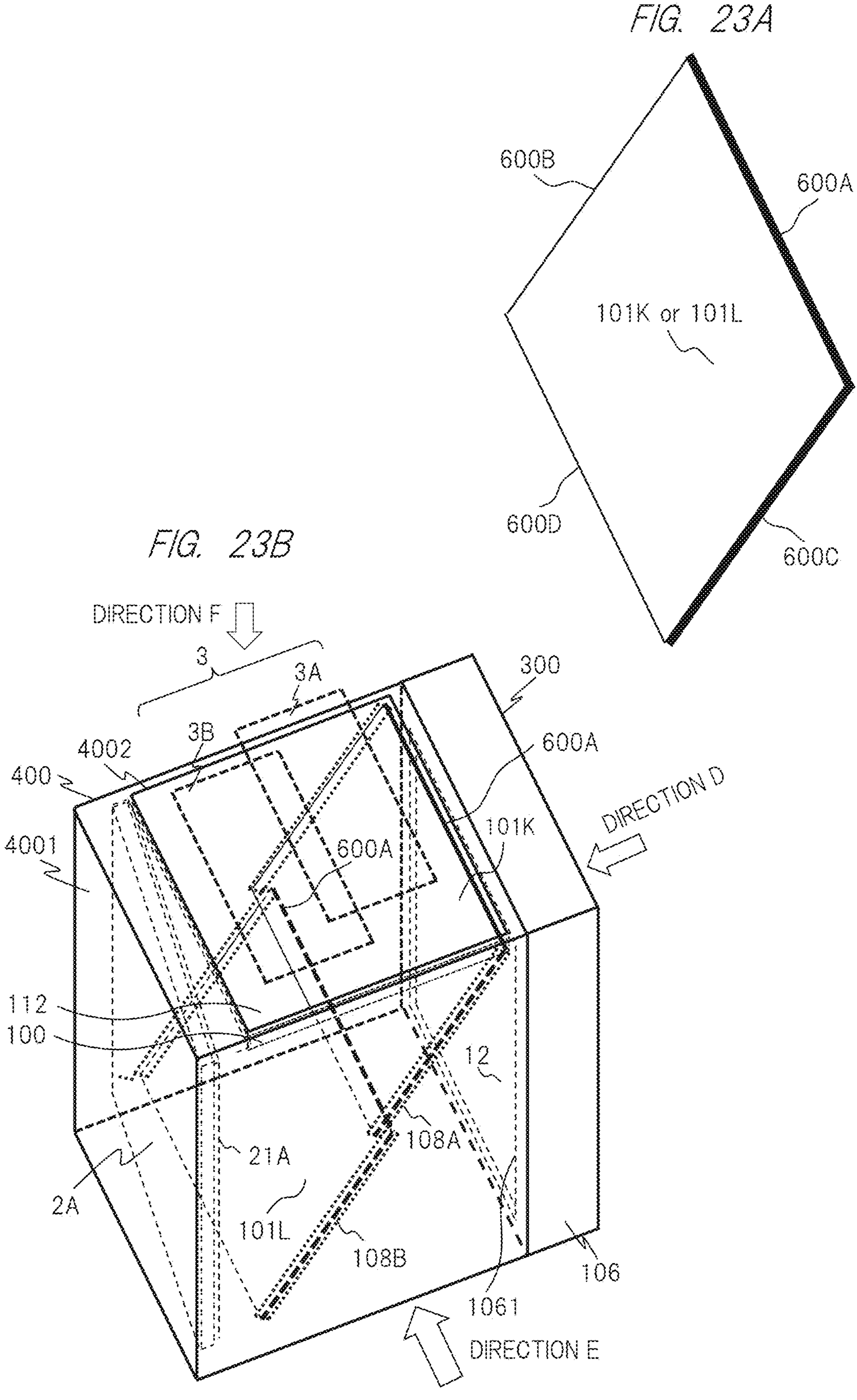
FIG. 23A is a diagram showing an external configuration example of an air floating video display apparatus and an example of a beam splitter according to one example (ninth example)
FIG. 23B is a diagram showing an external configuration example of an air floating video display apparatus and an example of a beam splitter according to one example (ninth example)

FIG. 23A shows a perspective view of external appearances of beam splitters 101K and 101L used in a preferred air floating video display apparatus according to one embodiment (referred to as a ninth embodiment) when viewed obliquely from above. FIG. 23B is an example in which the beam splitters 101K and 101L are applied to the (sixth embodiment) of FIG. 18. This embodiment can be used, for example, for installation on the desk. The beam splitters 101K and 101L are examples in which an antireflection treatment or anti-reflectors 600A, 600B, 600C, and 600D are applied to their side surfaces. In other words, the beam splitter, that is, an end face of at least one side around the polarization separator has a structure in which light non-reflection, reduction in light reflection, or light reflection prevention is applied.

When the user visually recognizes the air floating video 3 (3A, 3B) from the front direction F, sides of the beam splitters 101K and 101L, particularly, sides facing the direction F, reflect external light and enter the user's field of vision, which the interference or instinctness of the air floating videos 3 (3A, 3B) is caused. For this reason, the antireflection treatment or anti-reflectors 600A, 600B, 600C, and 600D is/are applied to the side surfaces of the beam splitters 101K and 101L. Consequently, reflection by external light can be reduced or prevented, and the user's visibility of the air floating video 3 (3A, 3B) can be improved.

An antireflection treatment method or an anti-reflector includes application of matte black paint, formation of unevenness on the end surface for scattering light, application of a reflective light reduction coating, adhesion of a reflective light reduction film, adhesion of a matte black tape, and the like. Note that the retroreflector 2A may be arranged so as to face the display panel 11 obliquely at a predetermined angle.

Tenth Embodiment

Figure 24:
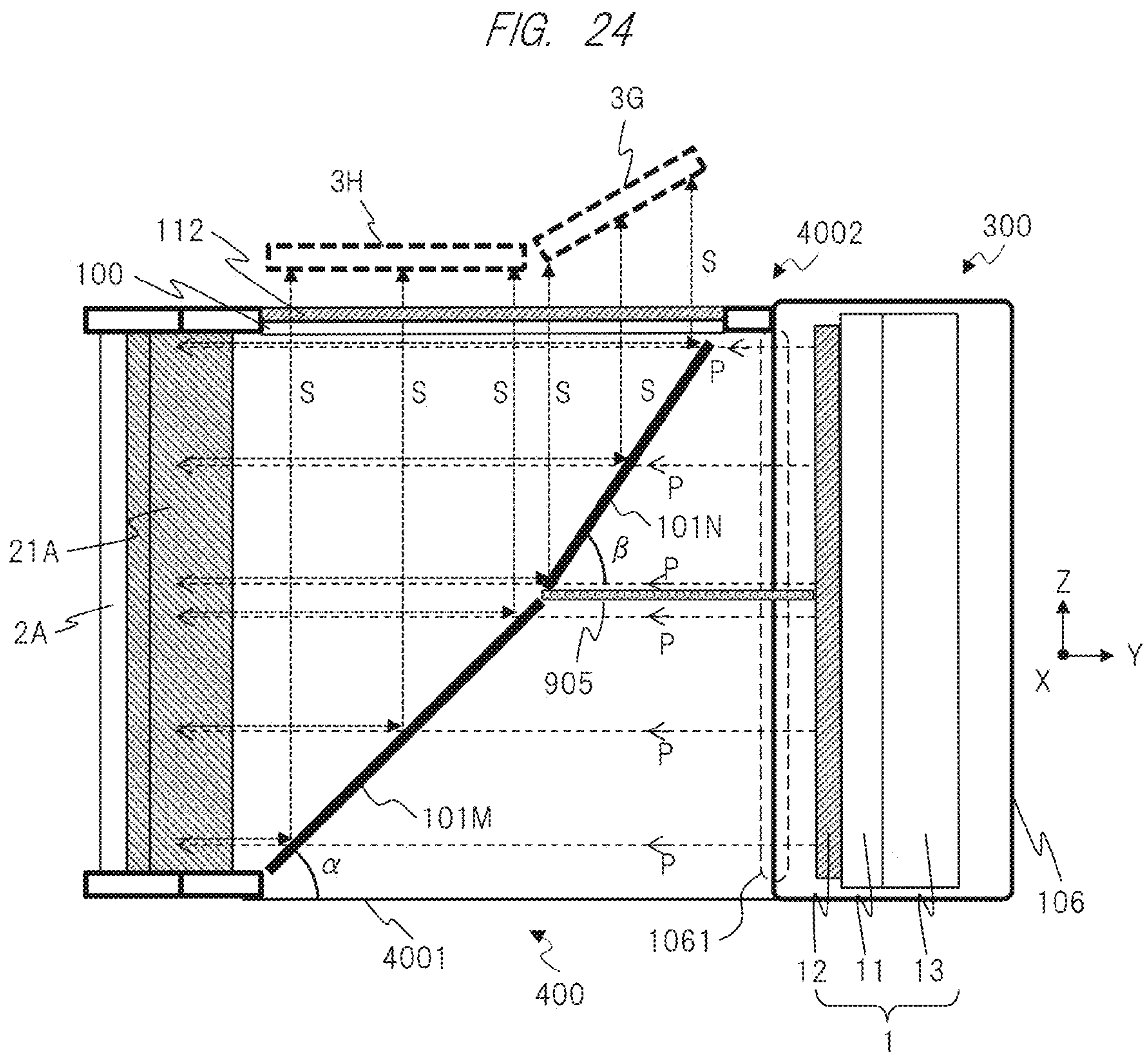
FIG. 24 is a diagram showing a cross-sectional configuration example of an air floating video display apparatus according to one embodiment (tenth embodiment) when viewed from a side.

FIG. 24 shows a sectional view of an external appearance as an appearance configuration example of a suitable air floating video display apparatus according to one embodiment (referred to as the 10th embodiment) when viewed from the side. This embodiment can be used, for example, for installation on the desk. The embodiment of FIG. 24 differs from the embodiment of FIG. 19A in the angles, at which separated beam splitters 101M and 101N are arranged obliquely with respect to the desk surface within the casing 4001, are not the same. In this embodiment, the beam splitters, that is, polarization separators are arranged plurally in number, and at least two polarization separators (101N, 101M) of the polarization separators are installed at different positions so as not to be installed on the same plane, and an angle between one polarization separator 101N and the display panel 11 and an angle between the other polarization separator 101M and the display panel 11 are different. Furthermore, among the two polarization separators (101N, 101M), an angle formed between the one polarization separator 101N and the retroreflector 2A and an angle formed between the other polarization separator 101M and the retroreflector 2A are different.

In FIG. 24, in the beam splitter 101M, an oblique angle $\alpha$ of the table surface (X-Y plane) to the Y direction is about 45 degrees, whereas in the beam splitter 101N, an oblique angle $\beta$ is set larger than 45 degrees ($\beta>\alpha$). The air floating video 3 (3H, 3G) formed by the video light from the beam splitters 101M and 101N is determined mainly according to an optical distance of an optical path of an optical system including the beam splitters 101M and 101N and the video display apparatus 1. The air floating video 3H formed correspondingly to the beam splitter 101M whose oblique angle $\alpha$ is about 45 degrees is almost horizontal with respect to the Y direction of the bottom surface of the casing 4001 or the desk surface (X-Y plane). In contrast, the air floating video 3G formed correspondingly to the beam splitter 101N whose oblique angle (is set larger than 45 degrees is arranged at an oblique angle to the direction Y of the bottom surface of the casing 4001 or the desk surface (X-Y plane).

The air floating videos 3H and 3G formed when the upper right side of the main surface of the beam splitter 101M and the lower left side of the main surface of the beam splitter 101N are arranged close to each other are arranged at a right end of the almost horizontal air floating video 3H, and the air floating video 3G forming an angle in the Z direction is formed.

In this embodiment, for example, a keyboard and a switch video are displayed on the air floating video 3H, and information is displayed on the air floating video 3G. consequently, since an information image has a different slope with respect to a switch video, visibility for the user (observer) is increased, which is suitable for improving operability. Note that the retroreflector 2A may be arranged so as to face the display panel 11 obliquely at a predetermined angle.

Eleventh Embodiment

Figure 25:
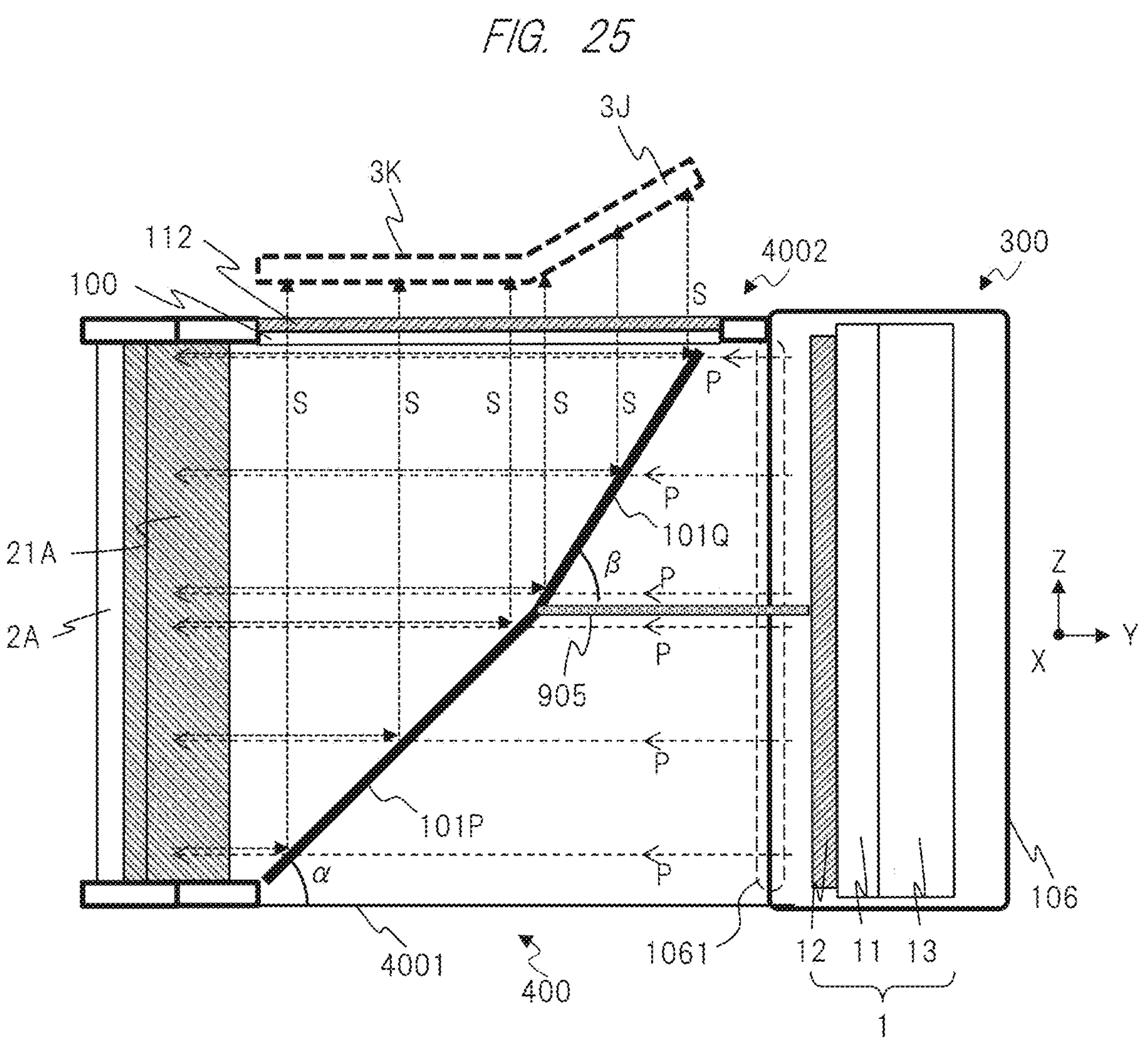
FIG. 25 is a diagram showing a cross-sectional configuration example of an air floating video display apparatus according to one example (eleventh example) when viewed from a side.

FIG. 25 shows a cross-sectional view of an external appearance as an external appearance configuration example of a preferred air floating video display apparatus according to one embodiment (referred to as an eleventh embodiment) when viewed from the side. This embodiment can be used, for example, for installation on the desk. The embodiment of FIG. 25 differs from the embodiment of FIG. 24 in that angles at which respective main surfaces of one undivided beam splitters 101P and 101Q are arranged with respect to the desk surface are not the same in the casing 4001. In addition, in this embodiment, the beam splitters, that is, the polarization separators are shown with different symbols for the beam splitters 101P and 101Q, but the polarization separators may be arranged as one beam splitter including the beam splitter 101P and the beam splitter 101Q.

When the number of polarization separators (beam splitters) is one, the polarization separator has at least one bent part and an angle between a first surface of the polarization separator on a display panel 11 side formed by the bent part and the display panel 11 is different from an angle between a second surface of the polarization separator on the display panel 11 side formed by the bent portion and the display panel 11. In addition, when the number of polarization separators (beam splitters) is one, the polarization separator has at least one bent part and an angle between a first surface of the polarization separator formed by the bent part on a retroreflector 2A and the retroreflector 2A is different from an angle between a second surface of the polarization separator formed by the bent portion on the retroreflector 2A side and the retroreflector 2A.

In FIG. 25, in the beam splitter 101P, the oblique angle $\alpha$ of the table surface (X-Y plane) with respect to the Y direction is about 45 degrees, whereas in the beam splitter 101Q, the oblique angle $\beta$ is set larger than 45 degrees. The air floating video 3 (3K, 3J) formed by the video light from the beam splitters 101P and 101Q is determined according to a distance between the beam splitters 101P and 101Q and the video display apparatus 1. The air floating video 3K formed correspondingly to the beam splitter 101P whose oblique angle $\alpha$ is about 45 degrees is almost horizontal with respect to the Y direction of the bottom surface of the casing 4001 or the desk surface (X-Y plane). In contrast, the air floating video 3J formed correspondingly to the beam splitter 101Q whose oblique angle $\beta$ is set larger than 45 degrees is arranged obliquely at the angle with respect to the Y direction of the bottom surface of the casing 4001 or the desk surface (X-Y plane).

For the air floating videos 3K and 3J, the air floating video 3J is formed with an angle in the Z direction from the right end of the almost horizontal air floating video 3K. In this embodiment, for example, a keyboard and a switch image are displayed on the air floating video 3K, and information is displayed on the air floating video 3J. Consequently, since an information image has a different slope with respect to a switch image, the visibility for the user (observer) is increased, which is suitable for improving the operability. Note that the retroreflector 2A may be arranged so as to face the display panel 11 obliquely at a predetermined angle.

Twelfth Embodiment

Figure 26:
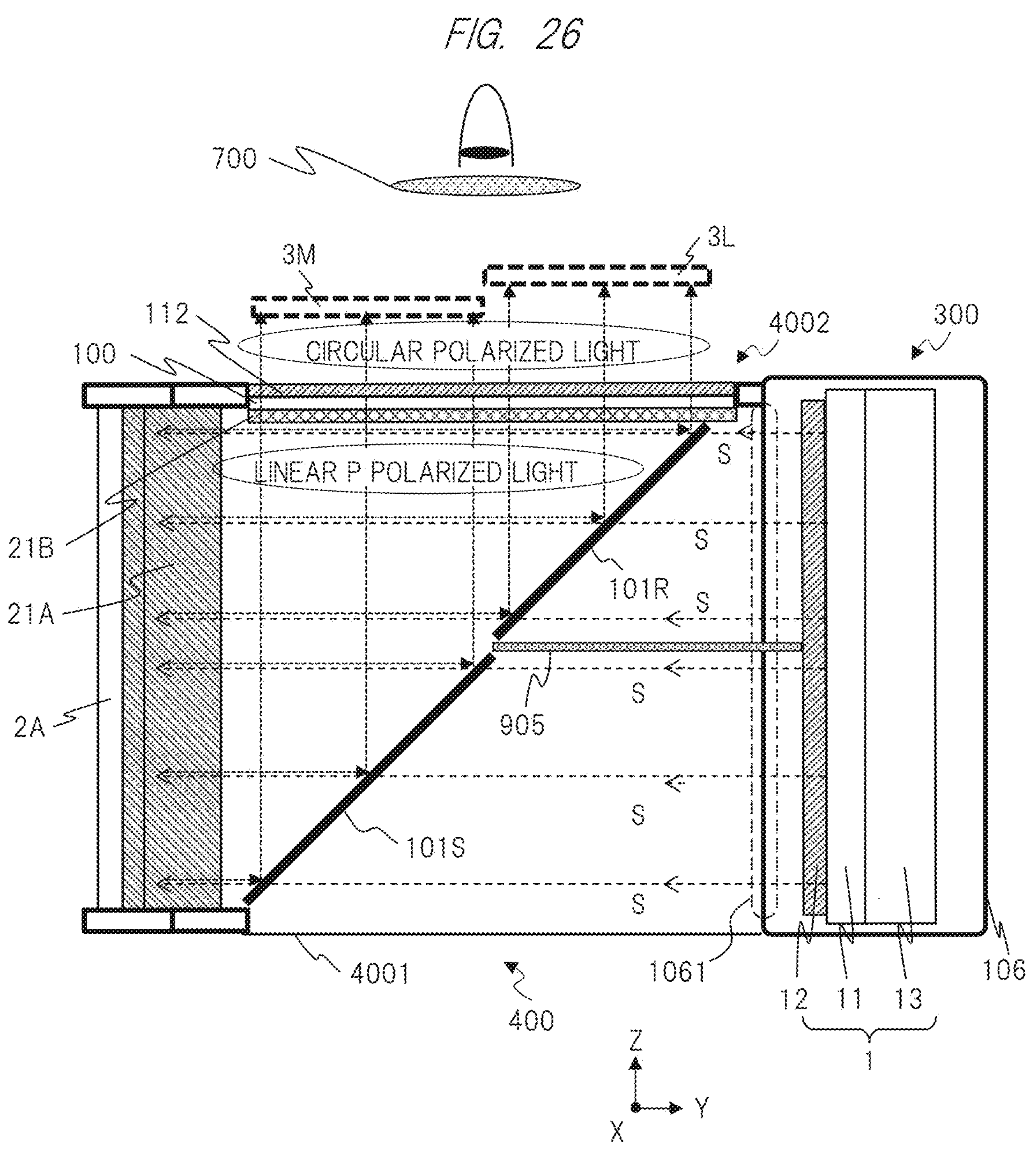
FIG. 26 is a diagram showing a cross-sectional configuration example of an air floating video display apparatus according to one example (twelfth example) when viewed from a side.

FIG. 26 shows a cross-sectional view of an exterior appearance from the side as an exterior appearance configuration example of a suitable air floating video display apparatus according to one embodiment (twelfth embodiment), which allows the user (observer) to visually recognize the air floating video regardless of whether or not wearing polarized sunglasses. This embodiment can be used, for example, for installation on the desk. The embodiment of FIG. 26 differs from the embodiment of FIG. 19A in that a λ/4 plate 21B disposed in an opening 4002 is arranged on the lower surface of the transparent member 100.

In this embodiment, the beam splitter, that is, the polarization separator is arranged plurally in number, and at least two polarization separators (101R, 101S) among the polarization separators are arranged at mutually different positions so as not to be arranged on the same plane. Further, a first λ/4 plate 21A is provided on a retroreflection surface of the retroreflector 2A, and a second λ/4 plate 21B is provided in a space connecting polarization separators 101R and 101S and air floating videos 3L and 3M.

Further, as video light of a specific polarization, which is emitted from the display panel 11, there are first video light from a divided first video region and second video light from a second video region. These video lights are incident on and transmit at least two polarization separators (101R, 101S) among the plurality of polarization separators at specific incident angles, and each of the transmitted video lights passes through the λ/4 plate 21A, is reflected by the retroreflector 2A, and is polarized and conversed by passing through the first λ/4 plate 21A again, thereby becoming video light of the other polarization. The video light of the other polarization is reflected by each of the polarization separators 101R and 101S, and is polarized and conversed by passing through the second λ/4 plate 21B, thereby becoming the video light of the other polarization. Then, at least two air floating videos 3L and 3M are displayed as air floating videos at mutually different predetermined positions based on the respective video lights of the other polarized wave. Here, the other polarized wave may be linearly polarized S-polarized light or P-polarized light.

In FIG. 26, the video light emitted from the liquid crystal display panel 11 is set as light having S polarization (vertical polarization; S stands for Senkrecht). This video light with the S-polarized light passes through the beam splitters 101R and 101S in the negative direction (left) of the Y direction as it is, and proceeds toward the retroreflector 2A. The beam splitters 101R and 101S have properties of passing the S-polarized light and reflecting the P-polarized light (parallel polarized light: P stands for Parallel). The beam splitters 101R and 101S are arranged so as to form an angle of, for example, about 45 degrees with this S-polarized video light. In other words, the beam splitters 101R and 101S are arranged so that their main surfaces form an angle of about 45 degrees with respect to the Z direction which forms the main surfaces of the liquid crystal display panel 11 and the retroreflector 2A. The video light with the S-polarized light transmits the beam splitters 101R and 101S and reaches the λ/4 plate 21A. By passing through the λ/4 plate 21A, the video light is reflected by the retroreflector 2A, transmits the λ/4 plate 21A twice in total, and is polarized and converted from the S-polarized light to the P-polarized light. The video light polarized and conversed into the P-polarized light is reflected by the beam splitters 101R and 101S, travels upward in the Z direction, and forms the air floating video 3M and 3L after passing through the λ/4 plate 21B, the transparent member 100, and the absorption polarization plate 112. The S-polarized light emitted from the liquid crystal display panel 11 is linearly polarized light, and the polarized light, which is polarized and conversed via the retroreflector 2A and the λ/4 plate 21A, reflected by the beam splitters 101R and 101S, and travels upward in the Z direction, also becomes linear P polarized light.

When only the transparent member 100 and the absorption polarization plate 112 are arranged in the opening 4002, air floating videos 3M and 3L of linear P-polarized light are formed. When the user (observer) is wearing polarized sunglasses 700, the commercially available polarized sunglasses 700 mainly transmit the S-polarized light, so that the air floating videos 3M and 3L formed by the P-polarized light of the linear polarized light cannot transmit the polarized sunglasses 700 and cannot be visually recognized by the user (observer).

As shown in FIG. 26, when the λ/4 plate 21B, the transparent member 100, and the absorption polarization plate 112 are arranged in the opening 4002, the linear P-polarized light reflected by the beam splitters 101R and 101S and traveling upward in the Z direction transmits the λ/4 plate 21B, thereby being changing to the circular polarized light and forming the floating videos 3M and 3L of the circular polarized light.

The user (observer) can visually recognize the air floating videos 3M and 3L of the circular polarized light in the same way as linear polarized light. Further, even when the user (observer) is wearing the polarized sunglasses 700, the air floating videos 3M and 3L of the circular polarized light transmits the polarized sunglasses 700, so that the user (observer) can visually recognize them. Therefore, such a suitable air floating video display apparatus is obtained that the user (observer) can visually recognize the air floating video regardless of whether or not to wear the polarized sunglasses.

Furthermore, this embodiment can be used, for example, for installation on the desk. Note that the λ/4 plate 21B may be placed at any position between the beam splitters 101R, 101S and the opening 4002 as long as it is before the air floating video is formed. Note that the retroreflector 2A may be arranged so as to face the display panel 11 obliquely at a predetermined angle.

Thirtieth Embodiment

Figure 27:
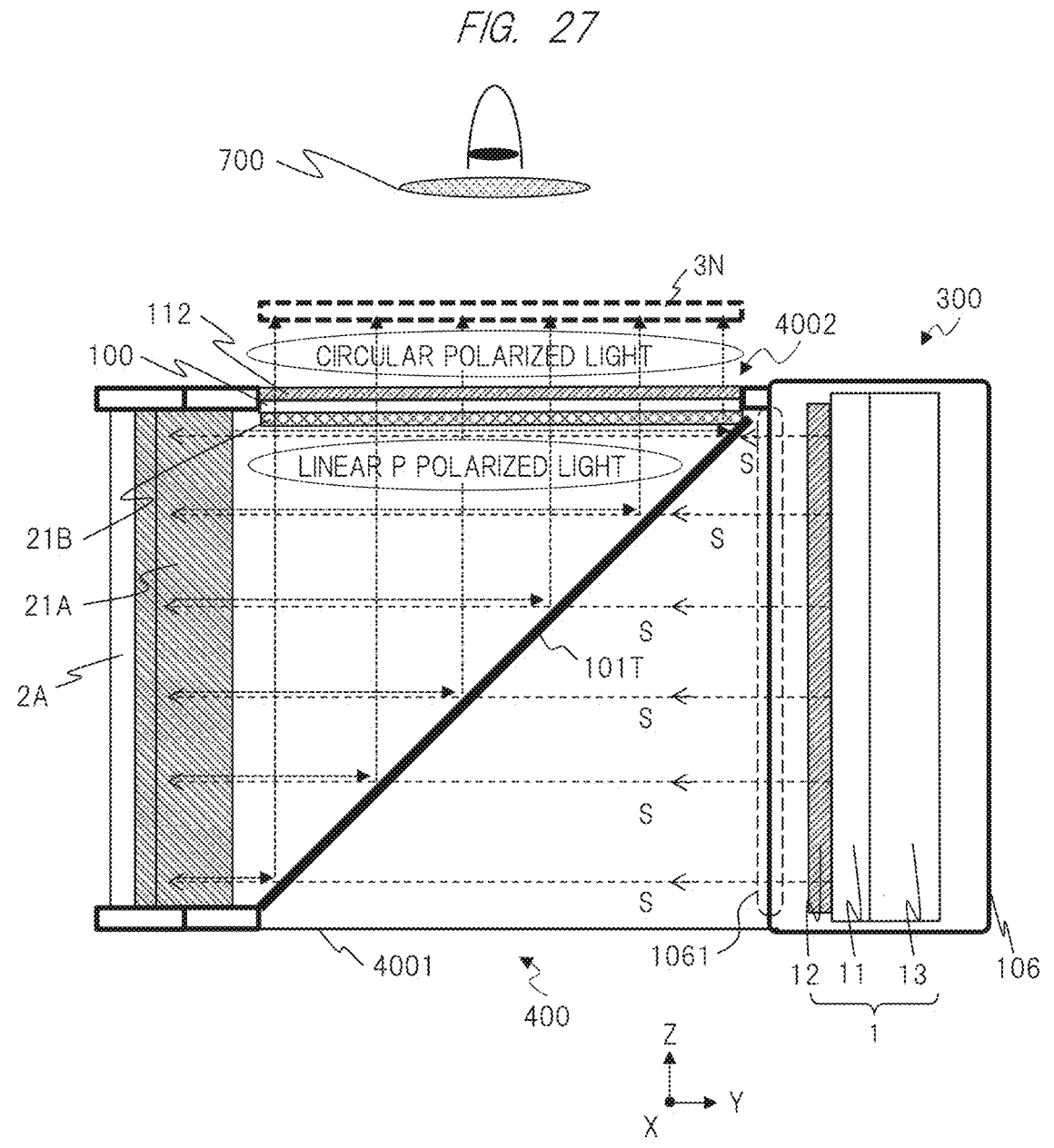

FIG. 27 shows a sectional view of an external appearance as an external appearance configuration example of a suitable air floating video display apparatus according to one embodiment (thirtieth embodiment) when viewed from the side. This embodiment can be used, for example, for installation on the desk. The embodiment shown in FIG. 27 shows a configuration example of the air floating video display apparatus different from the embodiment shown in FIG. 26 in that one beam splitter 101T not divided is arranged in the casing 4001.

In this embodiment, the beam splitter, that is, the polarization separator is arranged as one beam splitter (polarization separator) 101T. A first λ/4 plate 21A is provided on the retroreflection surface of the retroreflector 2A, and a second λ/4 plate 21B is provided in a space connecting the polarization separator 101T and the air floating video 3N. Further, as the video light of a specific polarized wave, which is emitted from the display panel 11, the first video light from the video region is incident on and transmits the polarization separator 101T at a specific incident angle, and the transmitted video light passes through the first λ/4 plate 21A, is reflected by the retroreflector 2A, and is polarized and conversed by passing through the first λ/4 plate 21A again, thereby becoming the video light of the other polarized wave, that is, becoming the P-polarized light from the S-polarized light. The video light of the other polarized wave is reflected by the polarization separator 101T and is polarized and conversed by passing through the second λ/4 plate 21B, thereby becoming the circular polarized light from the video light of the other polarized wave, that is, becoming the circular polarized light from the linear polarized light. Based on the video light, the air floating video 3N is displayed at a predetermined position.

In this embodiment, the air floating video 3N of the circular polarized light is formed. The user (observer) can visually recognize the air floating video 3N of the circular polarized light in the same way as the linear polarized light. Furthermore, even when the user (observer) is wearing the polarized sunglasses 700, the air floating image 3N of the circular polarized light transmits the polarized sunglasses 700, so that the user (observer) can visually recognize it. Therefore, such a suitable air floating video display apparatus is obtained that the user (observer) can visually recognize the air floating video regardless of whether or not the user (observer) is wearing the polarized sunglasses.

Furthermore, this embodiment can be used, for example, for installation on the desk. Note that the λ/4 plate 21B may be placed at any position between the beam splitter 101T and the opening 4002 as long as it is before the air floating video is formed. Note that the retroreflector 2A may be arranged so as to face the display panel 11 obliquely at a predetermined angle.

By the above-mentioned effects, the air floating video display apparatus of each embodiment and each modification example can be used in a relatively small room without emitting unnecessary video light to people other than the user, can display bright, highly visible, and excellent air floating video, and is small and lightweight, which makes it suitable for easy installation on a desk, table, shelf indoors, or the like.

Although the embodiments of the present disclosure have been specifically described above, the present disclosure is not limited to the above-described embodiments and can variously modified without departing from the gist. Unless specifically limited, each component may be singular or plural. The components of each embodiment can be added, deleted, replaced, or the like except for essential components. Further, a configuration in which each of the embodiments is combined can also be adopted.

For example, in the above embodiments, the beam splitters are located at two different positions mutually having the height difference or the step. However, the beam splitters are not limited to this, and the beam splitter may have two or more height differences or steps, or the positions and the number of divisions may be different. The plurality of beam splitters may be arranged in the X direction or the like instead of the Y direction, and the angles at which the beam splitters are arranged may be different. Further, the beam splitter may be a curved beam splitter instead of a flat plate shape. Furthermore, in the above embodiments, the embodiment when the user views the air floating video mainly in the vertical direction (direction F) has been shown, but the direction viewed by the user is of course not limited to this. If the arrangement of the air floating video display apparatus of each embodiment is arranged so as to be rotated or the like as a whole, such a form as to display the air floating video in a direction different from the above embodiment can be adopted.

With a technique(s) according to this embodiment, by displaying the air floating video in a state of air-floating high-resolution and high-illumines video information, this air floating video can also be used as a non-contact type user interface, and the users can operate the apparatus without worrying about contact infection of infectious diseases. This will contribute to "3. Health and Well-Being for All" that is the Sustainable Development Goals (SDGs) advocated by the United Nations.

In addition, in the technique according to this embodiment, by reducing the divergence angle of the emitted video light and aligning it with a specific polarized wave (polarized light), only the regular reflection light is efficiently reflected by the retroreflector, which makes it possible to obtain bright and clear air floating videos with high light utilization efficiency. According to the technique according to this embodiment, a non-contact user interface with excellent usability, which can significantly reduce power consumption, can be provided. This will contribute to "9. Create a foundation for nine industries and technological innovation" that is the Sustainable Development Goals (SDGs) advocated by the United Nations.

Furthermore, the technique according to the embodiment enables to form the air floating video by highly directional (straight-progressing) video light. With the technique according to this embodiment, highly directional video light is displayed even when displaying videos that require high security like so-called kiosk terminals or highly confidential videos that should be kept secret from the person directly facing the user. By doing so, it is possible to provide a non-contact user interface in which there is little risk of the air floating video being viewed by anyone other than the user. By providing the above-mentioned technique, the present invention contributes to "11: Creating livable cities" that is the Sustainable Development Goals (SDGs) advocated by the United Nations.

What is claimed is:

1. An air floating video display apparatus comprising:

a display panel that displays a video;

a retroreflector that reflects video light from the display panel and forms an air floating video in air with the reflected light; and a plurality of polarization separators arranged between the display panel and the retroreflector at a predetermined angle with respect to the display panel and the retroreflector, wherein at least two of the plurality of polarization separators are installed at mutually different positions so as not to be arranged on a same plane, the two polarization separators have a first side of the first polarization separator and a second side of the second polarization separator that are arranged close to each other at a predetermined interval, and the air floating video display apparatus includes a shielding member that shields the light from the display panel, the shielding member being configured so that the two polarization separators are arranged on a plane parallel to adjacent sides via the interval between the display panel and the polarization separator and between the display panel and the two polarization separators.

2. The air floating video display apparatus according to claim 1, wherein the two polarization separators have a first polarization separator arranged on the first layer, and a second polarization separator arranged on a second layer having the predetermined distance from the first layer, and the air floating video includes a first air floating video formed by the video light passing through the first polarization separator and a second air floating video formed by the video light passing through the second polarization separator, and the first air floating video and the second air floating video are formed at mutually different positions so as not to be arranged on the same plane.

3. The air floating video display apparatus according to claim 1, wherein the video light of a specific polarized wave, which is incident on the polarization separators, is P-polarized light.

4. The air floating video display apparatus according to claim 3, wherein the video light from the display panel is S-polarized light, and the air floating video display apparatus includes a λ/4 plate that converts the video light of the S-polarized light from the display panel into the P-polarized light incident on the polarization separator.

5. The air floating video display apparatus according to claim 1, wherein the polarization separators include a reflection type polarization plate or a metal multilayer film reflecting a specific polarized wave, the reflection type polarization plate or the metal multilayer film being formed as an optical thin film on a glass substrate.

6. The air floating video display apparatus according to claim 1, wherein surface roughness of the retroreflection surface of the retroreflector is set so that a ratio between a blur amount of the air floating video and a screen size of the display panel is 40% or less, the air floating video display apparatus includes a light source apparatus that supplies light to the display panel, the light source apparatus includes:

a point or planar light source;

an optical element unit that reduces a divergence angle of light from the light source;

a polarization convertor that aligns the light from the light source with polarized light in a specific direction; and a light guide having a reflection surface that propagates the light from the light source to the display panel, a video luminous flux of the video light from the display panel according to a shape and surface roughness of the reflection surface is controlled.

7. The air floating video display apparatus according to claim 1, wherein a specific incident angle of the video light of the specific polarized wave, which is incident on the polarization separators, is an angle within a range of 45 degrees or more and 60 degrees or less.

8. The air floating video display apparatus according to claim 1, further comprising a video light control sheet that reduces a divergence angle of the light from the display panel in a space connecting the display panel and the plurality of polarization separators.

9. The air floating video display apparatus according to claim 1, wherein the at least two polarization separators among the plurality of polarization separators respectively have areas of light incidence/emission surfaces different from each other or lengths of the light incidence/emission surfaces different from each other when viewed from a side surface forming the predetermined angle.

10. The air floating video display apparatus according to claim 1, the second polarization separator is arranged a side far from the air floating video, and the second polarization separator is arranged at a position shifted by a predetermined distance on the side far from the air floating video with respect to a position on an extension line of the first polarization separator.

11. The air floating video display apparatus according to claim 1, wherein in a direction connecting the plurality of polarization separators and the air floating video, the first polarization separator is arranged on a side close to the air floating video, the second polarization separator is arranged on a side far from the air floating video and the second polarization separator is arranged at a position shifted by a predetermined distance on the side close to the air floating video with respect to a position on an extension direction of the first polarization separator.

12. The air floating video display apparatus according to claim 1, wherein a λ/4 plate is provided on a retroreflection surface of the retroreflector, and as the video light of a specific polarized wave, which is emitted from the display panel, each of a first video light from a first video region and a second video light from a second video region, which are divided, is incident on and transmits the at least two polarization separators among the plurality of polarization separators at a specific incident angle, the respectively transmitted video lights are reflected by the retroreflector and are polarized and converted by passing through the λ/4 plate, thereby becoming the video light of other polarized wave, and the video light of the other polarized wave is reflected by each of the polarization separators, and displays at least two air floating videos at mutually different predetermined positions based on the respective reflected video lights.

13. The air floating video display apparatus according to claim 1, wherein the shielding member is arranged at a height position corresponding to a gap of the predetermined interval between the at least two polarization separators in a vertical direction.

14. The air floating video display apparatus according to claim 1, further comprising a video light control sheet provided on a video light emission surface of the display panel, wherein the video light control sheet is configured to restrict emission of video light in an oblique direction to prevent a viewer from directly viewing the display panel through the at least two polarization separators.

15. The air floating video display apparatus according to claim 1, wherein the at least two polarization separators are arranged with a shift distance in a direction perpendicular to their main surfaces, such that a first air floating video and a second air floating video are formed on different depth layers to create a three-dimensional effect.

16. The air floating video display apparatus according to claim 1, wherein the at least two polarization separators includes a reflective polarizer formed by a metal multilayer film deposited on a glass substrate, and wherein the video light emitted from the display panel is aligned with a transmission axis of the reflective polarizer to minimize light loss.

17. An air floating video display apparatus comprising:

a display panel that displays a video;

a retroreflector that reflects video light from the display panel and forms an air floating video in air with the reflected light; and a plurality of polarization separators arranged between the display panel and the retroreflector at a predetermined angle with respect to the display panel and the retroreflector, wherein at least two of the plurality of polarization separators are installed at mutually different positions so as not to be arranged on a same plane, wherein surface roughness of the retroreflection surface of the retroreflector is set so that a ratio between a blur amount of the air floating video and a screen size of the display panel is 40% or less.

18. The air floating video display apparatus according to claim 17, further comprising:

a light source apparatus that supplies light to the display panel, the light source apparatus including:

a point or planar light source;

an optical element unit that reduces a divergence angle of light from the light source;

a polarization convertor that aligns the light from the light source with polarized light in a specific direction; and a light guide having a reflection surface that propagates the light from the light source to the display panel.

19. The air floating video display apparatus according to claim 18, wherein a video luminous flux of the video light from the display panel according to a shape and surface roughness of the reflection surface is controlled.

20. The air floating video display apparatus according to claim 17, wherein a video luminous flux of the video light from the display panel according to a shape and surface roughness of the reflection surface is controlled.

* * * * *